US012754681B2

(12) United States Patent
Agarwal et al.

(10) Patent No.: US 12,754,681 B2
(45) Date of Patent: Oct. 6, 2026

(54) SMART HOST STREAM RELEASE

(71) Applicant: Sandisk Technologies, Inc., Milpitas, CA (US)

(72) Inventors: Leeladhar Agarwal, Fremont, CA (US); Dhanunjaya Rao Gorrle, Fremont, CA (US); Judah Gamliel Hahn, Ofra (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/485,070

(22) Filed: Oct. 11, 2023

(65) Prior Publication Data

US 2025/0123760 A1 Apr. 17, 2025

(51) Int. Cl.
*G06F 3/06* (2006.01)

(52) U.S. Cl.
CPC .......... *G06F 3/0631* (2013.01); *G06F 3/0604* (2013.01); *G06F 3/0659* (2013.01); *G06F 3/0688* (2013.01)

(58) Field of Classification Search
CPC .... G06F 3/0631; G06F 3/0604; G06F 3/0659; G06F 3/0688
USPC .......................................................... 711/154
See application file for complete search history.

(56) References Cited

U.S. PATENT DOCUMENTS 10,108,345 B2 10/2018 Choi et al.
10,191,688 B2 1/2019 Amaki et al.
10,635,346 B2 4/2020 Hodes et al.
10,957,381 B1 3/2021 Palmer
2005/0247774 A1* 11/2005 Sander .................. G06F 9/3834 712/E9.05
2012/0221776 A1* 8/2012 Yoshihashi ......... G06F 12/0866 711/E12.008
2015/0347025 A1* 12/2015 Law ........................ G06F 3/061 711/103
2019/0377512 A1* 12/2019 Hodes ................... G06F 3/0679
2023/0289078 A1* 9/2023 Wells .................... G06F 3/0604
2024/0028230 A1* 1/2024 Bert ........................ G06F 3/064

FOREIGN PATENT DOCUMENTS

KR 101735065 B1 5/2017

* cited by examiner

*Primary Examiner* — Gautam Sain
(74) *Attorney, Agent, or Firm* — Patterson + Sheridan, LLP

(57) ABSTRACT

Aspects of a storage device are provided for intelligently releasing a stream. The storage device includes one or more non-volatile memories, and one or more controllers operable to release a stream in the storage device. In particular, the controller(s) may, individually or in combination, obtain a stream release request from a host device, the stream release request indicating a stream identifier and including an indication of whether to deallocate a stream associated with the stream identifier, and deallocate, in response to the stream release request and based on the indication, a plurality of logical addresses associated with the stream from corresponding physical addresses associated with the one or more non-volatile memories. The deallocation may be performed without waiting for dataset management commands for deallocation from the host. Thus, reduced performance impact and latency may be achieved in the process of deallocating logical address ranges associated with a released stream identifier.

15 Claims, 13 Drawing Sheets

SMART HOST STREAM RELEASE

TECHNICAL FIELD

This disclosure is generally related to electronic devices, and more particularly, to storage devices that open and release streams of associated data.

DESCRIPTION OF THE RELATED TECHNOLOGY

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

During operation of a storage device, a host may apply a streams directive to indicate that specified user data in logical blocks in a write command are part of one group of associated data, or stream. Using this information, the storage device may store related data in associated locations or apply other performance enhancements. Later, when the stream is no longer in use by the host, the host may send to the storage device a streams directive indicating a release identifier operation to release the stream. In addition, the host may issue multiple dataset management (DSM) commands indicating to deallocate logical blocks that are associated with the released stream. However, each DSM command is structured to specify a starting logical address and a fixed length aligned to a stream granularity size, with no more than 256 ranges or lengths included per command. Moreover, these DSM commands are frequently interleaved with host input/output (IO) commands. Thus, the host may end up intermittently sending in a delayed manner numerous DSM commands respectively indicating multiple logical block lengths in total potentially encompassing thousands of LBA ranges for the released stream, resulting in significant impact to storage device performance and latency.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

One innovative aspect of the subject matter described in this disclosure may be implemented in a storage device. The storage device includes one or more non-volatile memories, and one or more controllers each communicatively coupled with at least one of the one or more non-volatile memories. The one or more controllers, individually or in any combination, are operable to cause the storage device to obtain a stream release request from a host device, the stream release request indicating a stream identifier and including an indication of whether to deallocate a stream associated with the stream identifier, and to deallocate, in response to the stream release request and based on the indication, a plurality of logical addresses associated with the stream from corresponding physical addresses associated with the one or more non-volatile memories.

Another innovative aspect of the subject matter described in this disclosure may be implemented in a method for releasing a stream in a storage device. The method includes obtaining a stream release request from a host device, the stream release request indicating a stream identifier and including an indication of whether to deallocate the stream associated with the stream identifier, and deallocating, in response to the stream release request and based on the indication, a plurality of logical addresses associated with the stream from corresponding physical addresses associated with one or more non-volatile memories.

A further innovative aspect of the subject matter described in this disclosure may be implemented in a storage device including one or more non-volatile memories, and means for releasing a stream in the storage device. The means for releasing the stream is configured to obtain a stream release request from a host device, the stream release request indicating a stream identifier and including an indication of whether to deallocate the stream associated with the stream identifier, and to deallocate, in response to the stream release request and based on the indication, a plurality of logical addresses associated with the stream from corresponding physical addresses associated with the one or more non-volatile memories.

It is understood that other aspects of the present disclosure will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present disclosure will now be presented in the detailed description by way of example, and not by way of limitation, with reference to the accompanying drawings, wherein.

DETAILED DESCRIPTION

Figure 1:
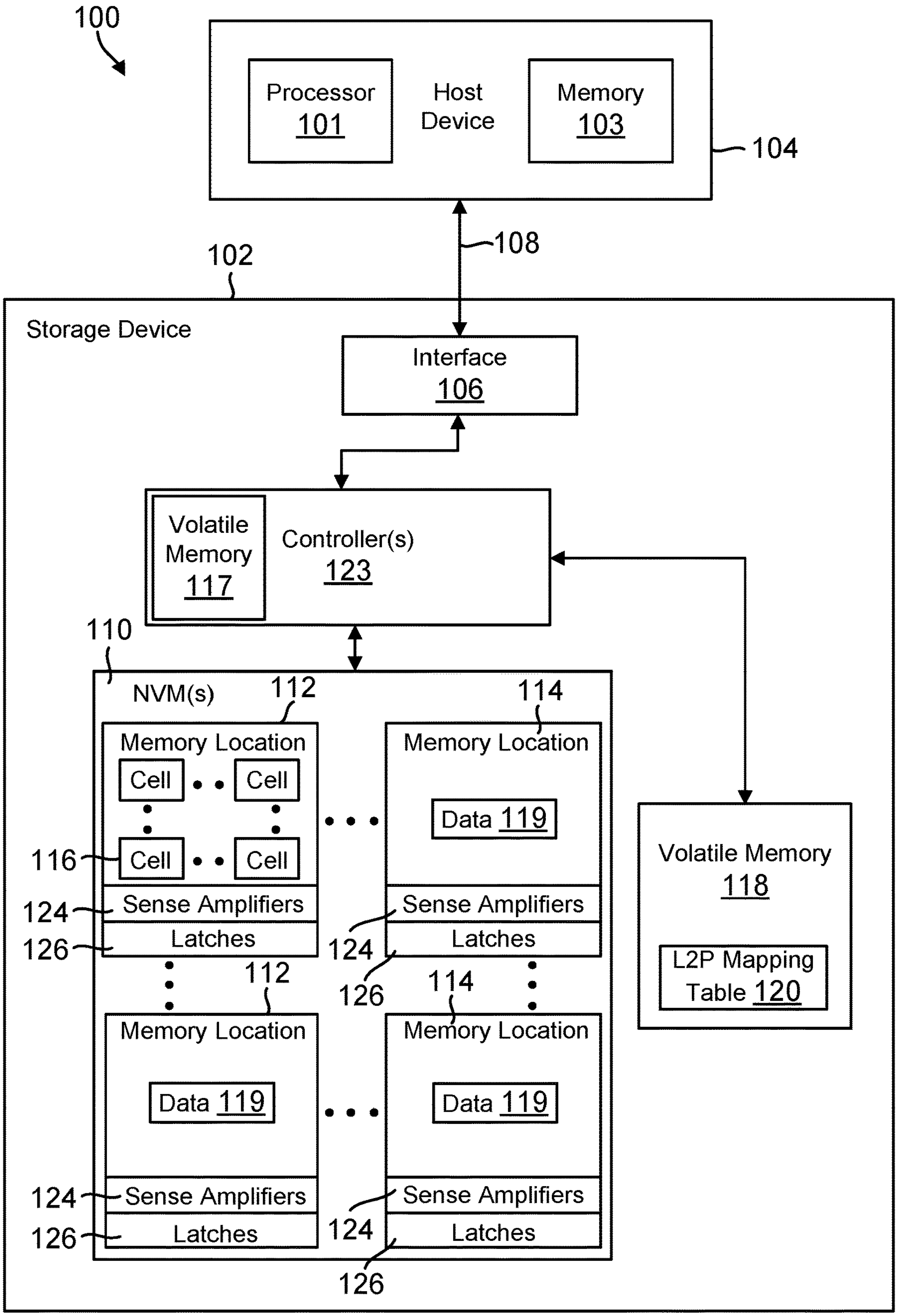
FIG. 1 is a block diagram illustrating an exemplary embodiment of a storage device in communication with a host device.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts. Acronyms and other descriptive terminology may be used merely for convenience and clarity and are not intended to limit the scope of these concepts.

Several aspects of a storage device in communication with a host device will now be presented with reference to various apparatus and methods. These aspects are well suited for flash storage devices, such as solid-state devices (SSDs) and Secure Digital (SD) cards. However, those skilled in the art will realize that these aspects may be extended to all types of storage devices capable of storing data. Accordingly, any reference to a specific apparatus or method is intended only to illustrate the various aspects of the present disclosure, with the understanding that such aspects may have a wide range of applications without departing from the spirit and scope of the present disclosure.

Typically, when a host device releases a stream, the host explicitly deallocates the logical block address (LBA) ranges that belong to the stream identifier being released using a Non-Volatile Memory Express (NVMe) standard Data Set Management (DSM) command. However, as the host has to send multiple DSM commands to the storage controller, this approach leads to increased overhead for the host and potential performance and Quality of Service (QOS) issues. For example, when the stream has thousands of LBA ranges, the host has to trigger numerous DSM commands to the storage controller for deallocating the ranges. This leads to increased host overhead of maintaining logical address mappings associated with the stream and flooding the storage controller with DSM deallocation requests at the time of stream release.

Moreover, in the traditional approach to stream release, the host handles deallocation requests in a delayed manner to prioritize its read/write traffic. For example, the host may handle read/write requests intermittently between DSM commands to avoid blocking read/write traffic. This approach may cause latency issues, as the overall deallocation process takes longer to complete due to the intermittent handling of read/write traffic.

To address these inefficiencies, the present disclosure provides a smart stream release process that offloads the stream content deallocation process from the host to the storage device while providing an efficient and optimized controller design for releasing the stream. In an example of the stream release process of the present disclosure, the host sets a self-deallocate option along with the stream release identifier when releasing a stream. For instance, the host may set a deallocate bit along with the stream identifier in a stream release request to the controller(s) of the storage device. In response to the self-deallocate option being set, the controller(s) may efficiently execute the deallocation request. For instance, prior to receiving the stream release request, the controller(s) may store the LBA ranges associated with the released stream, and the controller(s) may, at the time of the stream release request, internally handle invalidating the logical space of the stream without the intervention of the host. This process allows the host to avoid the transmission of explicit DSM commands in relation to the LBA ranges to be deallocated, which in turn reduces the number of commands between the host and the controller(s).

The stream release process of the present disclosure is also faster than the typical delayed manner approach for host deallocation, especially when the controller(s) are managing superblocks. For example, when the controller(s) manage block data in different superblocks, the controller(s) may deallocate multiple blocks in a superblock simultaneously. In contrast to other approaches where the controller(s) individually deallocate portions of a superblock in intermittent DSM requests from the host as they arrive, in this example approach the controller(s) may deallocate the entire superblock at once at the time of the stream release request. As each superblock may be processed independently at the same time, this parallel processing of superblocks significantly reduces the time required for deallocation, further minimizing the impact on latency and enhancing the overall efficiency of the system.

As a result, the storage device of the present disclosure may achieve improved efficiency in the stream release process. In one example, the stream release process of the present disclosure may minimize the host overhead of maintaining logical address mappings associated with a stream, thus reducing the workload on the host system. In another example, the stream release process of the present disclosure may prevent the storage controller(s) from being flooded with DSM deallocation requests at the time of a stream release, thereby avoiding potential performance and QoS issues. In a further example, the stream release process of the present disclosure may enable the storage device to internally handle invalidating the stream logical space without the intervention of the host, which is more efficient than the delayed handling of deallocation requests by the host. This not only allows the controller(s) to finish the deallocation process more quickly, but also more efficiently handle deallocation if the controller(s) manage each block data in different superblocks. Thus, by at least offloading the stream content deallocation to the controller(s), reducing host overhead, and preventing performance and QoS issues associated with the traditional approach of using DSM commands, the stream release process of the present disclosure may result in a more optimized and efficient storage system with better utilization of the interface between the host and the storage device, reduced traffic at the NVMe host interface, and improved stream content deallocation processing.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies, provided that the wireless protocol transports a block storage protocol such as PCIe/NVMe, SAS, or the like.

The storage device 102 includes a memory. For example, in the exemplary embodiment of FIG. 1, the storage device 102 may include one or more non-volatile memories (NVMs) 110 for persistent storage of data received from the host 104. The NVM(s) 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, N-level cell (XLC) memory, or any combination thereof), or NOR memory. The NVM(s) 110 may include a plurality of NVM memory locations 112 which may store system data for operating the storage device 102 or user data received from the host for storage in the storage device 102. For example, the NVM may have a cross-point architecture including a 2-D NAND array of NVM memory locations 112 having n rows and m columns, where m and n are predefined according to the size of the NVM. In the exemplary embodiment of FIG. 1, each NVM memory location 112 may be a die 114 including multiple planes each including multiple blocks of multiple cells 116. Alternatively, each NVM memory location 112 may be a plane including multiple blocks of the cells 116. The cells 116 may be single-level cells, multi-level cells, triple-level cells, quad-level cells, penta-level cells and/or N-level cells, for example. Other examples of NVM memory locations 112 are possible; for instance, each NVM memory location may be a block or group of blocks. Each NVM memory location may include one or more blocks in a 3-D NAND array. Each NVM memory location 112 may include one or more logical blocks which are mapped to one or more physical blocks. Alternatively, the memory and each NVM memory location may be implemented in other ways known to those skilled in the art.

The storage device 102 also includes one or more volatile memories 117, 118 that can, for example, include a Dynamic Random Access Memory (DRAM) or a Static Random Access Memory (SRAM). For example, as illustrated in FIG. 1, volatile memory 117 may be an SRAM internal to (or integrated into) controller(s) 123 of the storage device 102, while volatile memory 118 may be a DRAM external to (or remote from) controller(s) 123 of the storage device 102. However, in other examples, volatile memory 117 may be a DRAM external to controller(s) 123 and volatile memory 118 may be an SRAM internal to controller(s) 123, volatile memory 117, 118 may both be internal to controller(s) 123 or both be external to controller(s) 123, or alternatively, storage device 102 may include only one of volatile memory 117, 118. Data stored in volatile memory 117, 118 can include data read from the NVM 110 or data to be written to the NVM 110. In this regard, the volatile memory 117, 118 can include a write buffer or a read buffer for temporarily storing data.

The one or more memories (e.g. NVM(s) 110) are each configured to store data 119 received from the host device 104. The data 119 may be stored in the cells 116 of any of the NVM memory locations 112. As an example, FIG. 1 illustrates data 119 being stored in different NVM memory locations 112, although the data may be stored in the same NVM memory location. In another example, the NVM memory locations 112 may be different dies, and the data may be stored in one or more of the different dies.

Figure 2:
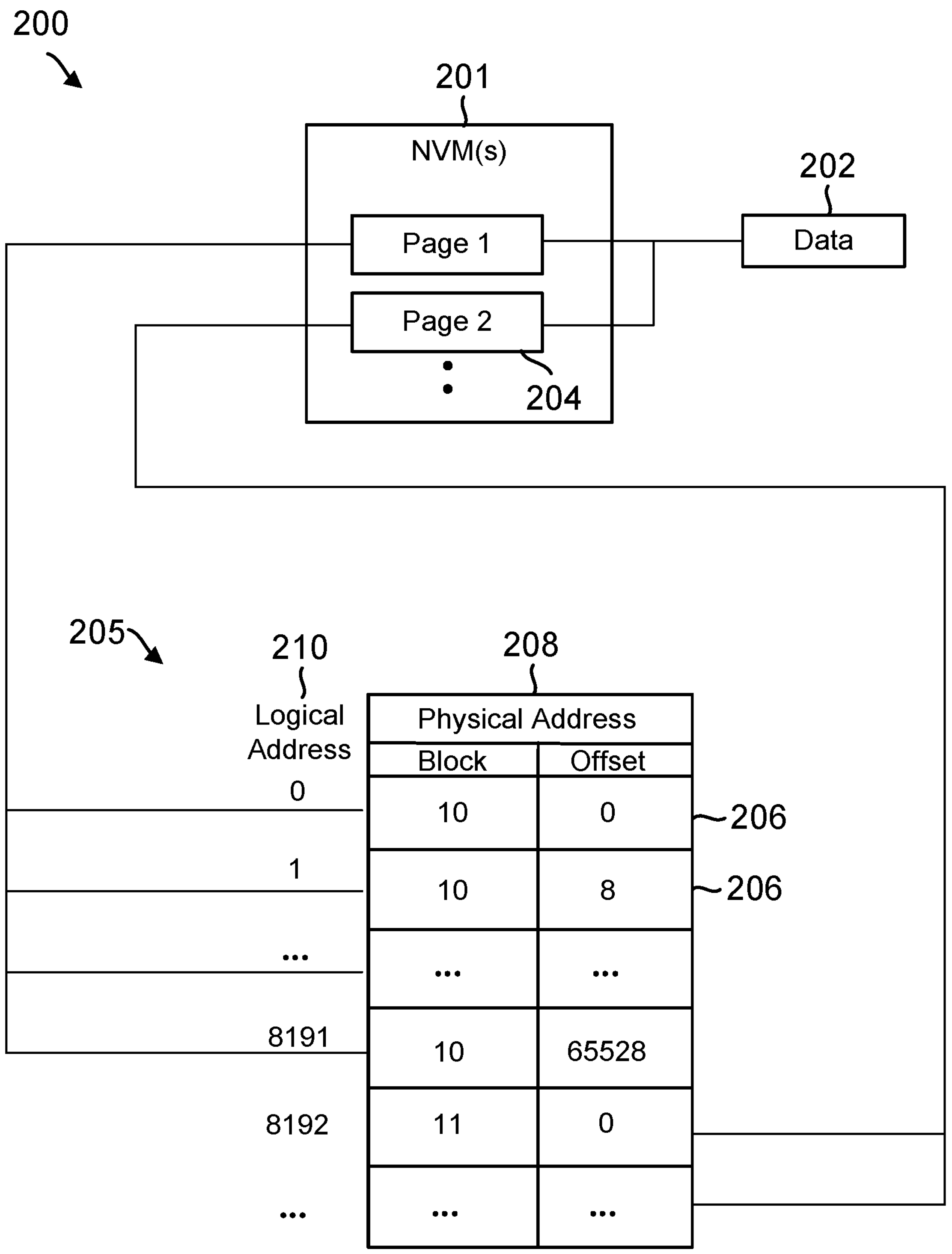
FIG. 2 is a conceptual diagram illustrating an example of a logical-to-physical mapping table in a non-volatile memory of the storage device of FIG. 1.

Each of the data 119 may be associated with a logical address. For example, the volatile memory 118 may store a logical-to-physical (L2P) mapping table 120 for the storage device 102 associating each data 119 with a logical address. The L2P mapping table 120 stores the mapping of logical addresses specified for data written from the host 104 to physical addresses in the NVM(s) 110 indicating the location(s) where each of the data is stored. This mapping may be performed by the controller 123 of the storage device. The L2P mapping table may be a table or other data structure which includes an identifier such as a physical address associated with each memory location 112 in the NVM(s) where data is stored. While FIG. 1 illustrates a single L2P mapping table 120 stored in volatile memory 118, in other examples, the L2P mapping table 120 may include multiple tables stored in volatile memory 118. Mappings may be updated in the L2P mapping table 120 respectively in response to host writes, and periodically the L2P mapping table 120 may be flushed from volatile memory 118 to one or more of the NVM memory locations 112 of NVM(s) 110 so that the mappings may persist across power cycles. In the event of a power failure in storage device 102, the L2P mapping table 120 in volatile memory 118 may be recovered during initialization from the L2P entries previously stored in NVM(s) 110. FIG. 2 is a conceptual diagram 200 of an example of an L2P mapping table 205 stored in volatile memory (e.g., the volatile memory 118 of FIG. 1) illustrating the mapping of data 202 received from a host device to logical addresses and physical addresses in NVM(s) 201 (e.g., the NVM(s) 110 of FIG. 1). The data 202 may correspond to the data 119 in FIG. 1, while the L2P mapping table 205 may correspond to the L2P mapping table 120 in FIG. 1. In one example, the data 202 may be stored in one or more pages 204 (e.g., physical pages) in NVM(s) 201. Each page 204 may be associated with a mapping set including one or more entries 206 of the L2P mapping table 205 respectively identifying a physical address 208 mapped to a logical address 210 (e.g., a logical block address (LBA)) associated with the data written to the NVM(s). A logical page may include one or more of the entries 206. An LBA may be a logical address specified in a write command for the data received from the host device. Physical address 208 may indicate the block and the offset at which the data associated with an LBA is physically written, as well as a length or size of the written data (e.g. 4 KB or some other size). In the illustrated example, page 204 encompassing 32 KB of data 202 may be associated with a mapping set including 8192, 4 KB entries. However, in other examples, page 204 may encompass a different amount of host data (e.g. other than 32 KB of host data) or may include a different number of entries 206 (e.g., other than 8192 entries), or entries 206 may respectively include different host data lengths (e.g., other than 4 KB each).

Referring back to FIG. 1, the NVM(s) 110 include sense amplifiers 124 and data latches 126 connected to each NVM memory location 112. For example, the NVM memory location 112 may be a block including cells 116 on multiple bit lines, and the NVM(s) 110 may include a sense amplifier 124 on each bit line. Moreover, one or more data latches 126 may be connected to the bit lines and/or sense amplifiers. The data latches may be, for example, shift registers. When data is read from the cells 116 of the NVM memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller(s) 123, after which the data is stored in the volatile memory 118 until it is transferred to the host device 104. When data is written to the cells 116 of the NVM memory location 112, the controller(s) 123 store the programmed data in the data latches 126, and the data is subsequently transferred from the data latches 126 to the cells 116.

The storage device 102 includes one or more controllers 123 which each includes circuitry such as one or more processors for executing instructions and can each include a microcontroller, a Digital Signal Processor (DSP), an Application-Specific Integrated Circuit (ASIC), a system on a chip (SoC), a Field Programmable Gate Array (FPGA), hard-wired logic, analog circuitry and/or a combination thereof. The one or more controllers 123 in the storage device 102 may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The controller(s) 123 are configured individually or in combination to receive data transferred from one or more of the cells 116 of the various NVM memory locations 112 in response to a read command. For example, the controller(s) 123 may read the data 119 by activating the sense amplifiers 124 to sense the data from cells 116 into data latches 126, and the controller(s) 123 may receive the data from the data latches 126. The controller(s) 123 are also configured individually or in combination to program data into one or more of the cells 116 in response to a write command. For example, the controller(s) 123 may write the data 119 by sending data to the data latches 126 to be programmed into the cells 116. The controller(s) 123 are further configured individually or in combination to access the L2P mapping table 120 in the volatile memory 118 when reading or writing data to the cells 116. For example, the controller(s) 123 may receive logical-to-physical address mappings from the volatile memory 118 in response to read or write commands from the host device 104, identify the physical addresses mapped to the logical addresses identified in the commands (e.g. translate the logical addresses into physical addresses), and access or store data in the cells 116 located at the mapped physical addresses. The controller(s) 123 are also configured individually or in combination to access the L2P mapping table 120 in the NVM(s) 110, for example, following a power failure during initialization, to recover or populate the L2P mapping table 120 in the volatile memory 118.

The aforementioned functions and other functions of the controller(s) 123 described throughout this disclosure may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, combinations of the aforementioned types of computer-readable media, or any other medium that can be used to store computer executable code in the form of instructions or data structures that can be accessed by a computer. Thus, software for implementing each of the aforementioned functions and components may be stored in computer-readable media such as the NVM(s) 110 or volatile memories 117, 118, or otherwise in a memory internal to or external to the storage device 102 or host device 104, and may be accessed by each controller(s) 123 for execution of software by the one or more processors of each controller(s) 123 individually or in combination. Alternatively, the functions and components of the controller(s) may be implemented with hardware in the controller(s) 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller(s) allocate a NVM memory location 112 in the NVM(s) 110 of storage device 102 for storing the data. The controller(s) 123 store the L2P mapping in the L2P mapping table 120 to map a logical address associated with the data to the physical address of the NVM memory location 112 allocated for the data. The controller(s) 123 then store the data in the NVM memory location 112 by sending it to one or more data latches 126 connected to the allocated NVM memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller(s) 123 access the L2P mapping in the L2P mapping table 120 to translate the logical addresses specified in the read command to the physical addresses indicating the location of the data. The controller(s) 123 then read the requested data from the NVM memory location 112 specified by the physical addresses by sensing the data using the sense amplifiers 124 and storing them in data latches 126 until the read data is returned to the host 104 via the host interface 106.

Figure 3:
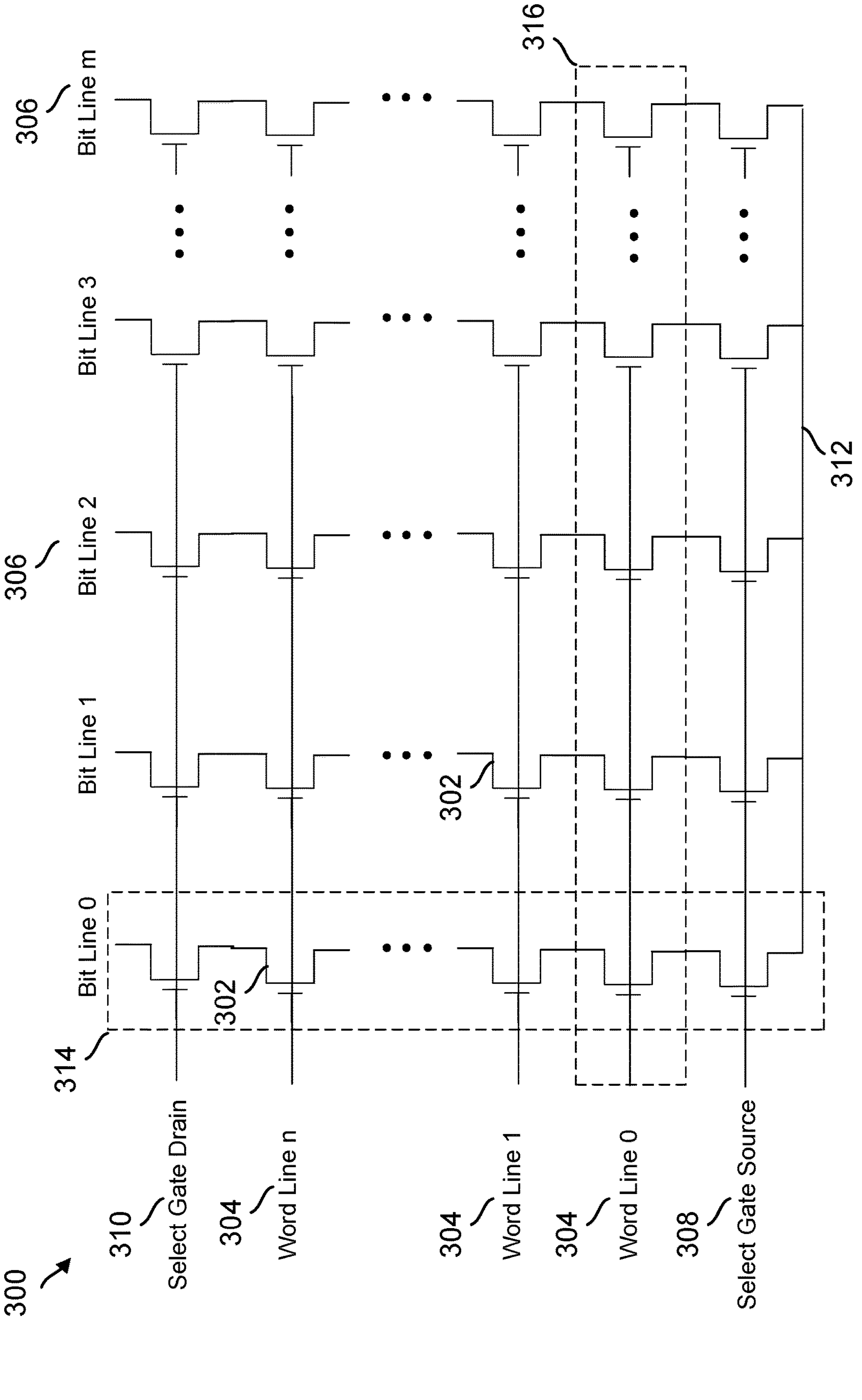
FIG. 3 is a conceptual diagram illustrating an example of an array of memory cells in the storage device of FIG. 1.

FIG. 3 illustrates an example of a NAND memory array 300 of cells 302. Cells 302 may correspond to cells 116 in the NVM(s) 110, 201 of FIGS. 1 and 2. Multiple cells 302 are coupled to word lines 304 and bit lines 306. For example, the memory array 300 may include n word lines and m bit lines within a block of a die 114 of the NVM(s) 110, where n and m are predefined according to the size of the block. Each word line and bit line may be respectively associated with a row and column address, which the controller(s) 123 may use to select particular word lines and bit lines (e.g. using a row and column decoder). For example, word lines 0-n may each be associated with their own row address (e.g. word line 0 may correspond to word line address 0, word line 1 may correspond to word line address 1, etc.), and bit lines 0-m may each be associated with their own column address (e.g. bit line 0 may correspond to bit line address 0, bit line 1 may correspond to bit line address 1, etc.). Select gate source (SGS) cells 308 and select gate drain (SGD) cells 310 are coupled to the memory cells 302 on each bit line 306. The SGS cells 308 and SGD cells 310 connect the memory cells 302 to a source line 312 (e.g. ground) and bit lines 306, respectively. A string 314 may include a group of cells 302 (including SGS and SGD cells 308, 310) coupled to one bit line within a block, while a page 316 may include a group of cells 302 coupled to one word line within the block.

Figure 4:
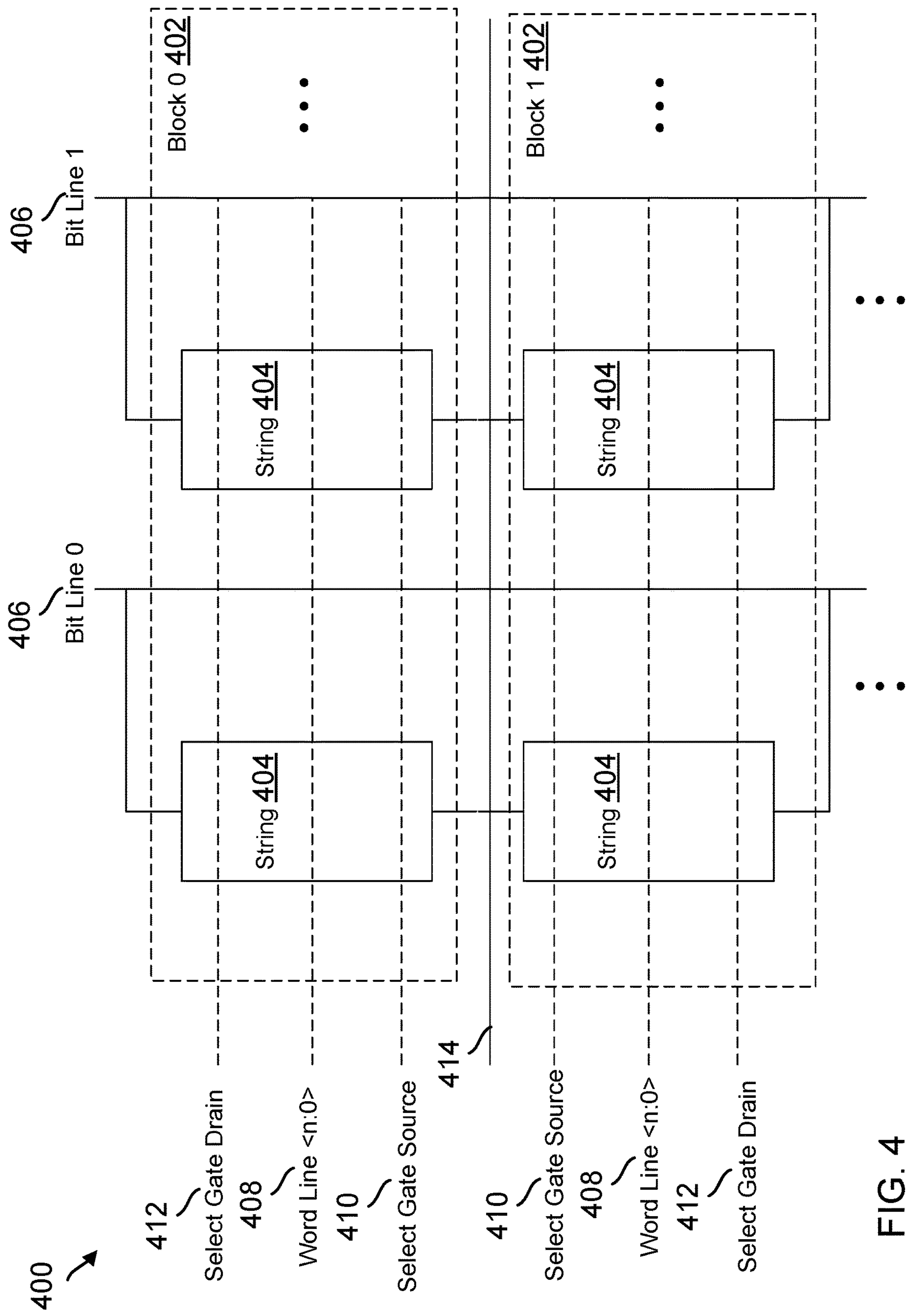
FIG. 4 is a conceptual diagram illustrating an example of an array of blocks in the storage device of FIG. 1.

FIG. 4 illustrates an example of a NAND memory array 400 of blocks 402 including multiple strings 404. Blocks 402 may correspond to blocks of a die 114 in the NVM(s) 110, 201 of FIGS. 1 and 2, and strings 404 may each correspond to string 314 in FIG. 3. As in the memory array 300 of FIG. 3, each string 404 may include a group of memory cells (e.g., cells 302) each coupled to a bit line 406 and individually coupled to respective word lines 408. Similarly, each string may include a SGS cell 410 and SGD cell 412 which respectively connects the memory cells in each string 404 to a source line 414 and bit line 406.

When the controller(s) 123 read data from or write data to a page 316 of cells 302 (i.e. on a word line 304, 408) in a block 402, the controller(s) may individually or in combination send a command to apply a read voltage or program voltage to the selected word line and a pass through voltage to the other word lines. The read or programmed state of the cell (e.g. a logic '0' or a logic '1' for SLCs) may then be determined based on a threshold voltage of the cells 302. For example, during an SLC read operation, if the threshold voltage of a cell 302 is smaller than the read voltage (i.e. current flows through the cell in response to the read voltage), the controller(s) 123 may determine that the cell stores a logic '1', while if the threshold voltage of the cell 302 is larger than the read voltage (i.e. current does not flow through the cell in response the read voltage), the controller(s) 123 may determine that the cell stores a logic '0'. Similarly, during an SLC program operation, the controller(s) may store a logic '0' by sending a command to apply the program voltage to the cell 302 on the word line 304, 408 until the cell reaches the threshold voltage, and during an SLC erase operation, the controller(s) may send a command to apply an erase voltage to the block 402 including the cells 302 (e.g. to a substrate of the cells such as a p-well) until the cells reduce back below the threshold voltage (back to logic '1').

For cells that store multiple bits (e.g. MLCs, TLCs, etc.), each word line 304, 408 may include multiple pages 316 of cells 302, and the controller(s) 123 may similarly send commands to apply read or program voltages to the word lines or word line strings to determine the read or programmed state of the cells based on a threshold voltage of the cells. For instance, in the case of TLCs, each word line 304, 408 may include three pages 316, including a lower page (LP), a middle page (MP), and an upper page (UP), respectively corresponding to the different bits stored in the TLC. In one example, when programming TLCs in a TLC program operation, the LP may be programmed first, followed by the MP and then the UP. For example, a program voltage may be applied to the cell on the word line 304, 408 until the cell reaches a first intermediate threshold voltage corresponding to a least significant bit (LSB) of the cell. Next, the LP may be read to determine the first intermediate threshold voltage, and then a program voltage may be applied to the cell on the word line until the cell reaches a second intermediate threshold voltage corresponding to a next bit of the cell (between the LSB and the most significant bit (MSB)). Finally, the MP may be read to determine the second intermediate threshold voltage, and then a program voltage may be applied to the cell on the word line until the cell reaches the final threshold voltage corresponding to the MSB of the cell. Alternatively, in other examples, the LP, MP, and UP may be programmed together (e.g., in full sequence programming or Foggy-Fine programming), or the LP and MP may be programmed first, followed by the UP (e.g., LM-Foggy-Fine programming). Similarly, when reading TLCs in a TLC read operation, the controller 123 may read the LP to determine whether the LSB stores a logic 0 or 1 depending on the threshold voltage of the cell, the MP to determine whether the next bit stores a logic 0 or 1 depending on the threshold voltage of the cell, and the UP to determine whether the final bit stores a logic 0 or 1 depending on the threshold voltage of the cell. Finally, when erasing TLCs in a TLC erase operation, the controller(s) may send a command to apply an erase voltage to the block 402 including the cells 302 (e.g., to the substrate of the cells such as the p-well) until all the cells reduce back below their respective threshold voltages, effectively resetting all bits to their initial logic state (e.g., logic '1'). This erase process is similar to that of SLCs, but since TLCs store multiple bits per cell, the erase operation resets the state of all bits within the cell.

Figure 5:
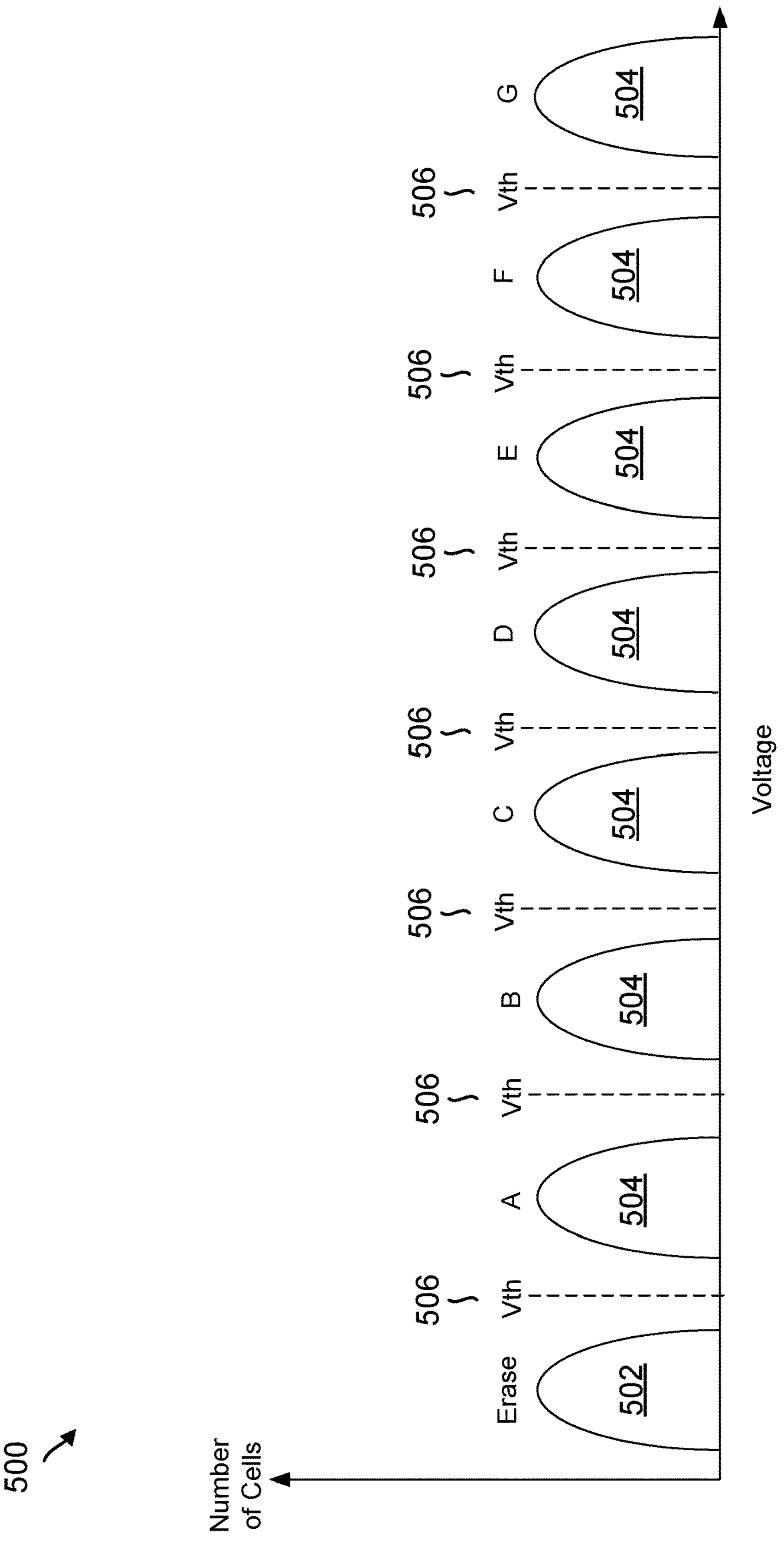
FIG. 5 is a graphical diagram illustrating an example of a voltage distribution chart for triple-level cells in the storage device of FIG. 1.

FIG. 5 illustrates an example of a voltage distribution chart 500 illustrating different NAND states for TLCs (e.g. cells 116, 302) storing three bits of data (e.g. logic 000, 001, etc. up to logic 111). The TLCs may include an erase state 502 corresponding to logic '111' and multiple program states 504 (e.g. A-G) corresponding to other logic values '000-110'. The program states 504 may be separated by different threshold voltages 506. Initially, the cells 116, 302 may be in the erase state 502, e.g. after the controller(s) 123 erase a block 402 including the cells. When the controller(s) 123 program LPs, MPs, and UPs as described above, the voltages of the cells 116, 302 may be increased until the threshold voltages 506 corresponding to the logic values to be stored are met, at which point the cells transition to their respective program states 504. While FIG. 5 illustrates eight NAND states for TLCs, the number of states may be different depending on the amount of data that is stored in each cell 116, 302. For example, SLCs may have two states (e.g. logic 0 and logic 1), MLCs may have four states (e.g. logic 00, 01, 10, 11), and QLCs may have sixteen states (e.g. erase and A-N).

Figure 6:
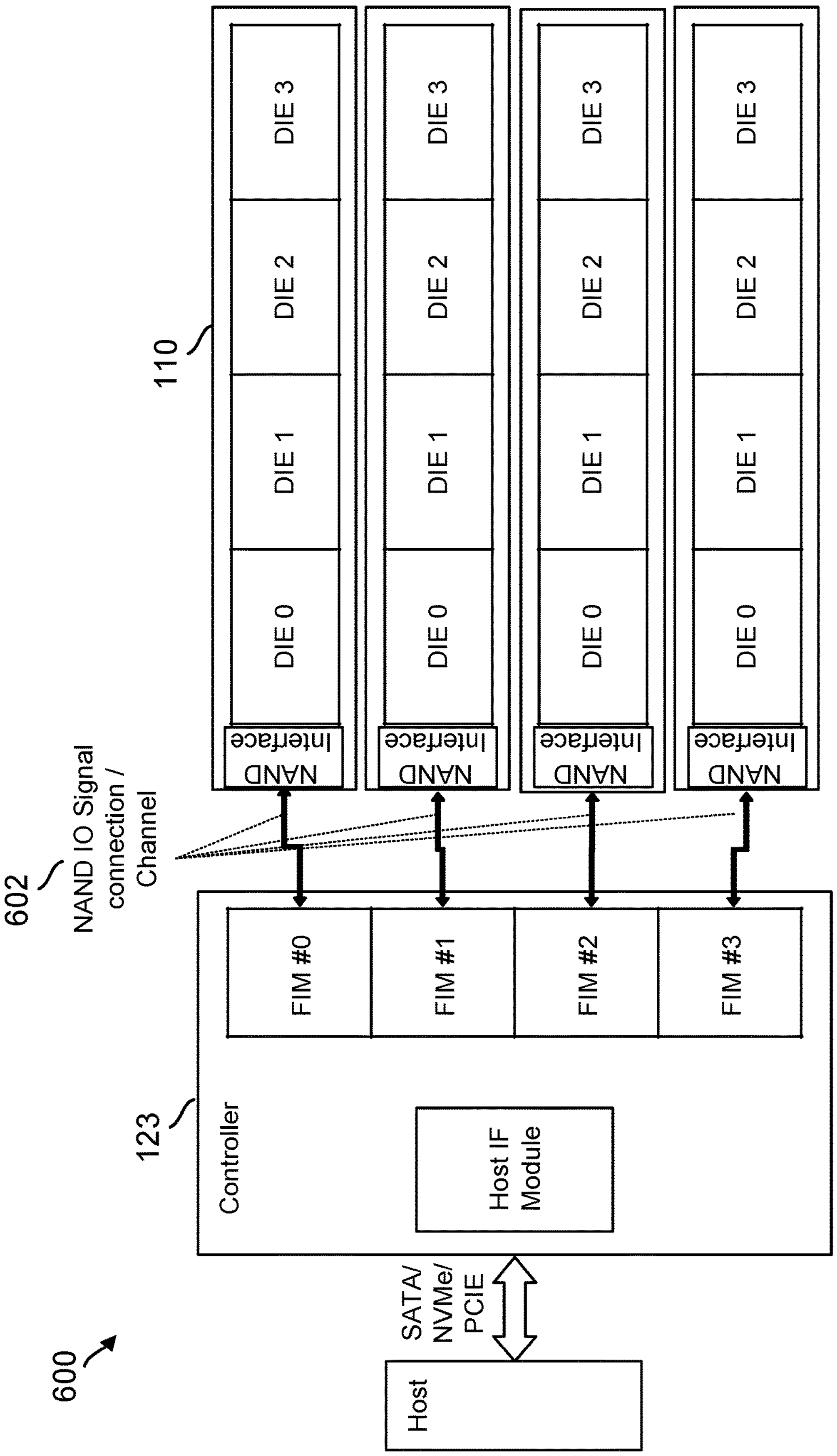
FIG. 6 is a conceptual diagram illustrating an example of an architecture of the storage device of FIG. 1.

FIG. 6 illustrates an example 600 of an SSD architecture. The Flash Interface Module (FIM) and NAND Input/Output (IO) Channel are components in the architecture of SSDs. A FIM serves as an intermediary between the SSD main controller, which may be one example of controller(s) 123, and the NAND flash memory, such as NVM(s) 110, facilitating data transfer and communication. Each FIM is connected to a single NAND input/output (IO) channel or channel 602, which is responsible for managing the flow of data between the FIM and the NAND flash memory. The FIM is capable of controlling single or multiple dies within a NAND package, allowing for efficient management of memory resources and improved performance. In an SSD main controller, there may be multiple FIMs (such as 1, 2, 4, 8, etc.), with the exact number depending on the specific SSD architecture.

Figure 7:
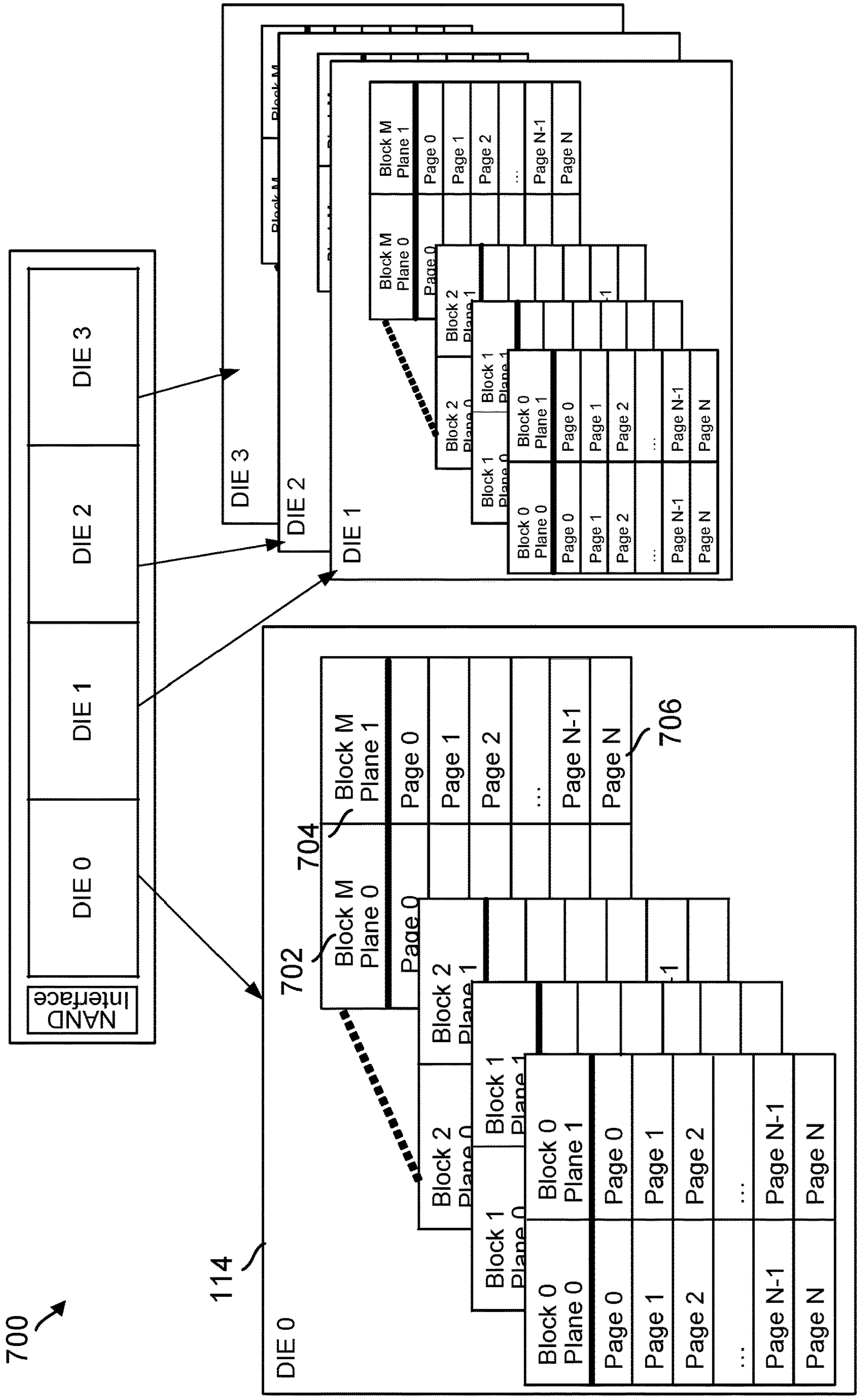
FIG. 7 is a conceptual diagram illustrating an example of a hierarchical structure of NAND flash memory in the storage device of FIG. 1.

FIG. 7 illustrates an example 700 of a hierarchical structure of NAND flash memory. A NAND flash memory may be organized into a hierarchical structure consisting of dies 114, blocks 702, planes 704, and pages 706. A die is the basic unit of a NAND flash memory chip, and it contains multiple blocks within it. Each block is further divided into a number of pages, which are the smallest data storage units in NAND flash memory. A plane is an intermediate level of organization that exists between blocks and dies, allowing for parallel operations and increased performance. In the logical view of NAND flash memory illustrated in FIG. 7, there are N pages per plane, per block out of M logical blocks, per die.

Figure 8:
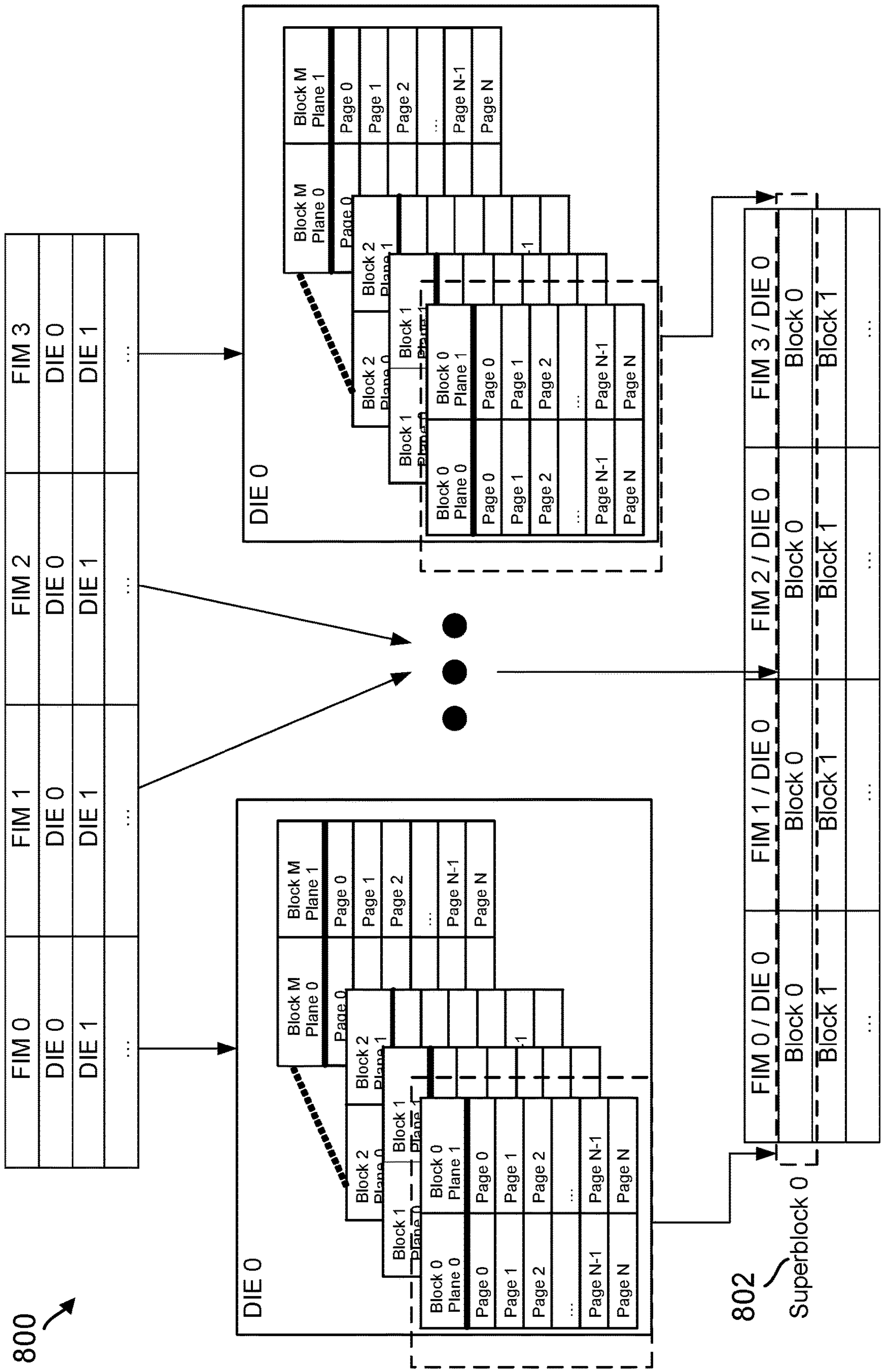
FIG. 8 is a conceptual diagram illustrating an example of relationships of NAND flash memory components in the storage device of FIG. 1.

FIG. 8 illustrates an example 800 of component relationships in NAND flash memory systems. In the illustrated example, a relationship between dies, FIMs, metablocks or superblocks 802, and blocks are shown for NAND flash memory systems. A die, as previously mentioned, is the basic unit of a NAND flash memory chip, while a FIM serves as an intermediary between the SSD main controller and the NAND flash memory. A metablock or superblock is a higher-level organizational structure that contains one block associated with each FIM and plane. This configuration allows for parallel processing and improved performance, as multiple FIMs may access different blocks within the superblock simultaneously. The block number within a superblock is configurable, providing flexibility in the memory organization and management. Furthermore, the number of FIMs associated with a superblock is also configurable; for example, this number may be set to values such as 2, 4, or 8 depending on the specific SSD architecture and performance requirements.

During operation of storage device 102, the host device 104 may apply a streams directive to indicate to the controller(s) 123 via a stream identifier that specified user data in logical blocks 702 in a write command are part of one group of associated data or stream. The controller(s) 123 may then apply this information to store related data in associated memory locations such as blocks 402 or dies 114 or apply other performance enhancements. For example, the controller(s) 123 may open a stream when the host 104 issues a write command that specifies a stream identifier that is not currently open, and the controller(s) may maintain context for that stream such as buffers for associated data while the stream remains open.

Later, when the stream identifier for that stream is no longer in use by the host 104, the host sends to the controller(s) 123 a streams directive indicating a release identifier operation and including the stream identifier to be released. This stream release identifier operation directive may indicate to the controller(s) 123 that if the host 104 uses that stream identifier in a future operation such as a subsequent write command, then that stream identifier is referring to a different stream. In addition, the host 104 may issue multiple dataset management (DSM) commands indicating to deallocate logical blocks 702 that are associated with the released stream. However, each DSM command is structured to specify a starting logical address and a fixed length aligned to a stream granularity size, with no more than 256 ranges or lengths included per command. Moreover, these DSM commands are frequently interleaved with host IO commands, and these DSM commands may respectively indicate logical blocks 702 associated with a metablock or superblock 802. Thus, the host may end up intermittently sending numerous DSM commands respectively indicating respective logical block lengths or ranges of logical addresses 210 associated with individual portions of a superblock 802, in total potentially encompassing thousands of LBA ranges for the released stream identifier.

Figure 9:
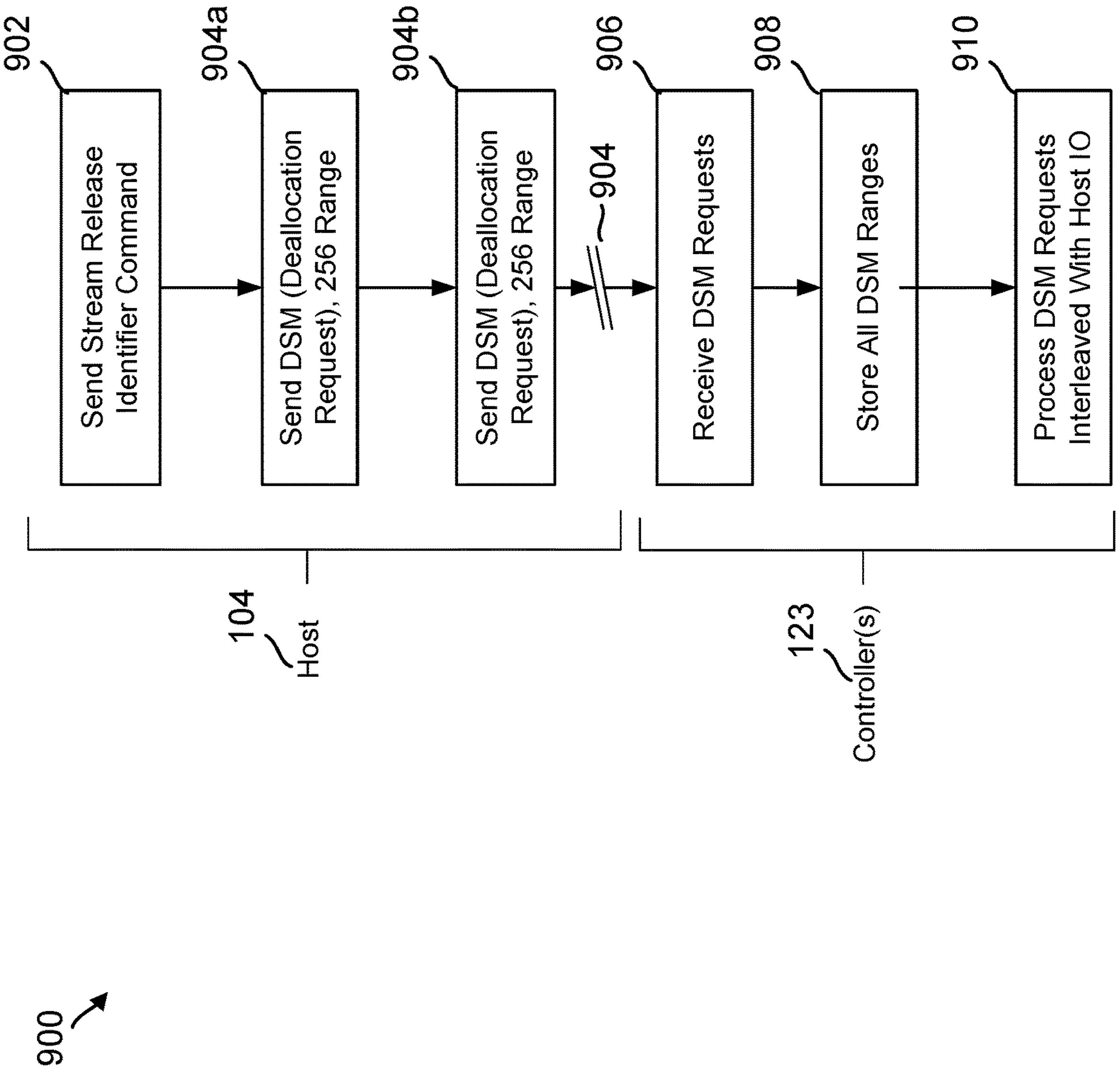
FIG. 9 is a flow chart illustrating an example of a stream release process including dataset management (DSM) requests issued to the storage device of FIG. 1.

FIG. 9 illustrates an example 900 of a stream release and logical block deallocation process including DSM commands. Initially, at block 902, the host 104 sends a streams directive indicating a stream release identifier operation to the controller(s) 123. The streams directive may include a stream identifier to be released. Afterwards at blocks 904*a*, 904*b* (collectively blocks 904), the host 104 floods the controller(s) 123 with multiple DSM commands respectively including requests to deallocate ranges of logical blocks 702 associated with the stream identifier. The host 104 may also send to the controller(s) 123 host write commands or read commands intermittently between various DSM commands. Subsequently at block 906 and block 908 respectively, the controller(s) 123 receive the DSM commands including the deallocation requests for respective portions of the logical range associated with the entire stream, and the controller(s) 123 store the entire logical range indicated in the totality of DSM commands in memory. Afterwards at block 910, the controller(s) process the DSM commands, such as deallocating or trimming the ranges of logical addresses 210 indicated in respective DSM commands while maintaining the validity of the data for a potential new stream, in addition to interleaving this processing with host read command or write command handling.

However, while this process of FIG. 9 may successfully result in deallocation of logical blocks 702 associated with a released stream identifier, it may significantly impact storage device performance and latency. In one example, the process may result in extensive firmware operations, since the controller(s) 123 may end up deallocating thousands of logical address ranges divided across respective ones of numerous received DSM commands in portions of 256 logical address ranges for a single released stream. In another example, this process may result in extensive scanning and tracking of data validity, since each time the controller(s) 123 deallocate logical blocks 702 in a portion of superblock 802, the controller(s) may have previously invalidated data resulting from host IO operations interleaved between different DSM commands, and thus to avoid deallocating blocks associated with invalid data inadvertently in response to a DSM command, the controller(s) may scan the L2P mapping table 120, 205 or superblock 802 to determine whether the logical blocks to be deallocated are still associated with valid data. In a further example, the controller(s) 123 may perform garbage collection in response to host IO operations interleaved between DSM commands, thereby resulting in the controller(s) 123 performing L2P mapping updates or other complex operations for data validity and increasing the write amplification factor (WAF) of the storage device.

In an additional example, on top of the significant amount of work that the controller(s) 123 may perform to identify valid data to deallocate, the controller(s) 123 may end up performing significant resource-intensive operations such as extensive L2P mapping updates to accomplish partial superblock deallocations in response to received DSM commands. For instance, each time the controller(s) 123 deallocate logical blocks 702 in a portion of superblock 802, in addition to performing L2P mapping table scanning or block scanning to verify the deallocated logical blocks are valid, the controller(s) 123 may perform mapping updates that re-allocate other logical blocks to the superblock 802 to keep the length of the superblock 802 intact. The delayed and interleaved nature of DSM commands may cause the controller(s) 123 to be limited to performing these complex, partial superblock deallocations, as opposed to simpler, complete superblock deallocations in response to a received DSM command, since other DSM commands associated with the remainder of the superblock are still in progress or in transit from the host 104.

While such effects on storage device performance or latency may potentially be reduced by outsourcing the work to the host 104 for deallocating logical addresses 210 associated with a released stream, this outsourcing may undesirably incur significant host overhead or result in other concerns. For example, in an open-channel SSD environment, where the host 104 maintains L2P mappings for superblocks 802 in L2P mapping table(s) 120, 205 in lieu of storage device 102, storage device latency may be reduced since the host 104 rather than the storage device 102 scans the superblock 802 or L2P mapping table 120, 205 for valid or unexpired logical addresses associated with a stream to deallocate via L2P mapping updates instead. However, this approach may incur significant host overhead as a result of outsourcing the L2P mapping operations to the host 104 for scanning and identifying the logical address ranges to be deallocated.

Moreover, while other approaches have been considered to improve storage device performance and latency, these approaches may still result in extensive operations at the storage device 102 or the host 104. For example, various approaches that have been considered for deallocating logical blocks 702 associated with a released stream either provide for the storage device 102 to search and identify expired or obsolete data for deallocation, or provide for the host 104 to replicate an original extent map for a stream being released. These and similar situations may occur in response to, or when, the host constructs DSM commands for deallocation such as previously described. Accordingly, it would be helpful to provide a simplified process for deallocating logical blocks associated with a released stream identifier.

To this end, the controller(s) 123 of the storage device 102 of the present disclosure may be configured to individually or in combination deallocate a range of logical addresses 210 associated with a given stream in a more optimal manner than in the aforementioned approaches, leading to improved performance and reduced latency. In particular, rather than receiving DSM commands from the host 104 indicating logical ranges to be deallocated and deallocating superblock portions on a piecemeal basis such as previously described, here the controller(s) 123 may deallocate the entire range of logical addresses 210 associated with a stream in response to the stream release identifier operation included in the streams directive itself. More particularly, the host 104 may include a deallocation indicator, such as a bit or other parameter, in the streams directive or command indicating the stream identifier associated with the stream release identifier operation. In response to this bit being set or otherwise indicating the controller(s) 123 to perform the deallocation, the controller(s) 123 may determine a superblock 802, namespace, or otherwise an entire range of logical addresses 210 associated with the released stream identifier from maintained context for that stream (e.g., from buffers for associated data or from a superblock mapping table mapping superblocks 802 to stream identifiers). The controller(s) 123 may then deallocate, such as trim, de-map, or in some cases even securely erase, the logical blocks in this identified logical address range. For example, the controller(s) 123 may identify superblock 802 associated with the stream identifier and/or determine the logical addresses 210 mapped to that superblock 802 in one or more superblock mapping tables or other maintained context for the stream, and the controller may de-map the logical addresses 210 associated with that superblock 802 corresponding to the released stream from the currently associated physical addresses 208 in the L2P mapping table 120, 205.

Thus, by refraining from sending DSM commands and instead triggering the controller(s) 123 to automatically deallocate the logical blocks 702 in the initial stream release operation, the host 104 may avoid scanning and identifying the entire logical address range associated with the stream to be deallocated via individual DSM commands. Instead, the host 104 may offload the responsibility for deallocation to the controller(s) 123 of the storage device 102, thereby reducing host overhead. Moreover, the host 104 may perform this offloading without requiring the controller(s) 123 to perform scanning and identifying of valid logical address ranges instead as part of extensive data validity tracking in response to interleaved host IO operations, or without requiring the controller(s) 123 to perform L2P mapping updates in response to partial superblock deallocations, thereby reducing latency and resulting in a more efficient and streamlined process for deallocating data associated with a released stream identifier. For example, after identifying the entire superblock associated with a released stream identifier from the maintained context for the associated stream at the storage device 102 in response to the streams directive, the controller(s) 123 may simply deallocate the superblock 802 from the L2P mapping table 120, 205 at once, rather than complexly determining as previously described, from intermittent DSM commands from the host, which portions or blocks 702 of the superblock 802 are valid to de-map and which replacement logical addresses are valid to re-map to the superblock in their stead (until the entire superblock or stream is eventually deallocated over time). Accordingly, the stream deallocation process may be simplified and rendered more efficient than in other performance impacting and latency-intensive processes such as that of FIG. 9.

Figure 10:
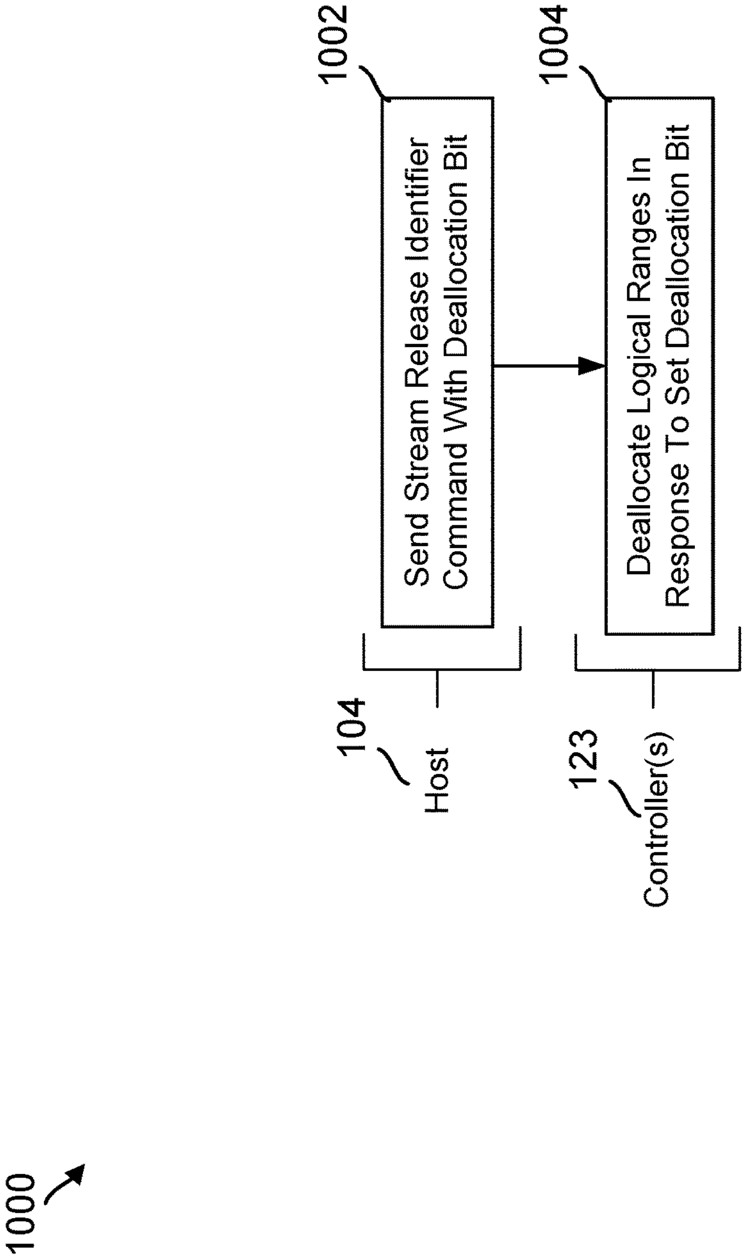
FIG. 10 is a flow chart illustrating an example of a stream release process without DSM requests issued to the storage device of FIG. 1.

FIG. 10 illustrates an example 1000 of a stream release and logical block deallocation process without DSM commands. Initially, at block 1002, the host 104 sends to the controller(s) 123 a streams directive indicating a stream release identifier operation and including a stream identifier to be released, similar to block 902 of FIG. 9. However, in contrast to FIG. 9, here the streams directive may further include a deallocation bit, which bit may indicate the controller(s) 123 to deallocate logical blocks associated with the stream if set and to refrain from such deallocation if reset. Here, it should be understood that 'set' or 'reset' is intended to refer to a bit state which respectively indicates to perform or not to perform deallocation, rather than a specified bit value. For example, bit values of '1' or '0' may both be interpreted as 'set' in different configurations, or as 'reset' in other configurations, depending on whichever value is configured to indicate the controller(s) to perform deallocation. In response to the deallocation bit being set or indicating stream deallocation is to be performed, then at block 1004, the controller(s) 123 may proceed to deallocate (e.g., de-map, trim, or secure erase) the range of logical addresses 210 or superblock(s) 802 associated with the released stream in one time instance (e.g., one deallocation operation or set of consecutive deallocation operations). Thus, the deallocation process of FIG. 10 may be faster and more efficient than the deallocation process of FIG. 9.

Figure 11:
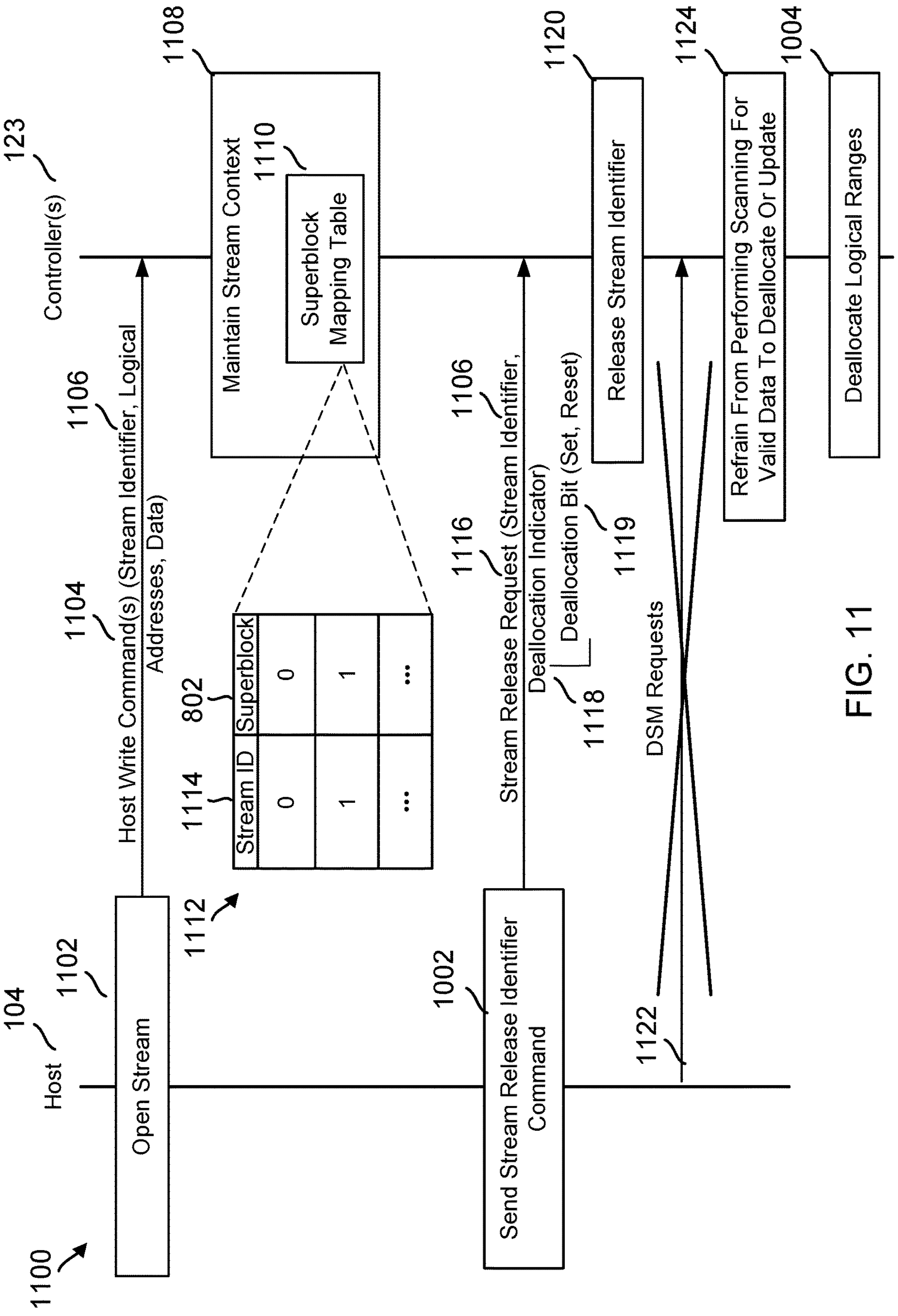
FIG. 11 is a call flow diagram illustrating an example of a stream release process without DSM requests issued to the storage device of FIG. 1.

FIG. 11 illustrates a more specific example 1100 of this process of FIG. 10. Prior to releasing the stream at block 1002, such as when or after opening the stream at block 1102, the host may send one or more write commands 1104 or other command(s) to the controller(s) 123 that indicate a stream identifier 1106 associated with the logical blocks 702 to be written or otherwise associated with data 119, 202. In response to such write command(s) 1104 or other command(s), the controller(s) 123 at block 1108 may maintain context associated with the stream. For example, the controller(s) 123 may track the logical addresses 210 of the logical blocks 702 associated with the stream in memory buffers, or update a superblock mapping table 1110 including a mapping 1112 of stream identifiers 1114 to superblocks 802. From this maintained context, the controller(s) 123 may ascertain the superblock(s) 802, namespace(s), or otherwise the entire logical address range associated with the stream at the time the host 104 transmits a stream release request 1116 to the controller(s) 123. This stream release request 1116 (the streams release directive or stream release identifier operation command) transmitted at block 1002 may be separate from the write command 1104 or other host IO command.

In addition to instructing the controller(s) 123 to release the stream associated with the indicated stream identifier 1106, the stream release request 1116 may include a deallocation indicator 1118 such as a deallocation bit 1119 indicating whether or not the controller(s) 123 are to deallocate the logical blocks 702 associated with that stream. Before, while, or after the controller(s) 123 release the stream at block 1120, if the controller(s) 123 determine that the deallocation indicator 1118 requests deallocation, the controller(s) 123 may at block 1004 autonomously de-map the logical blocks 702 associated with the released stream in the L2P mapping table 120, 205 or superblock mapping table 1110 in one instance. The controller(s) 123 may perform this deallocation without waiting first to receive any DSM commands 1122 from the host 104 (in contrast to the example of FIG. 9), and without needing to rescan or search through its L2P mapping table 120, 205 for valid data to deallocate or to re-map as a result of a partial superblock deallocation or for other reasons. For instance, the controller(s) 123 may refrain at block 1124 from doing such validity scanning, or from performing L2P mapping updates to achieve partial superblock deallocation, since here the entire superblock may be deallocated in a single instance.

In one example, where the deallocation indicator 1118 is implemented as deallocation bit 1119 in the streams release directive or stream release identifier operation command, this bit may be one of the reserved bits of the command. When this bit 1119 is set, the host 104 may indicate to the controller(s) 123 to deallocate the data 119, 202 associated with the indicated stream. For example, in response to determining this bit 1119 is set in the command or request 1116, the controller at block 1004 may read or fetch its L2P mapping table(s) 120, 205 and superblock mapping table(s) 1110 stored in memory (e.g., volatile memory 117, 118 or NVM 110, 201), determine the LBAs or logical addresses 210 associated with the released stream from these mapping table(s), and then deallocate the LBAs or un-map the LBAs from corresponding physical blocks or physical addresses 208 in a single deallocation operation or set of consecutive deallocation operations. Thus, host and device communication may be simplified in the case of stream release in the process of FIGS. 10 and 11. For instance, by allowing the host 104 to set the bit 1119 (or more generally the indicator 1118) in the stream release identifier operation command to indicate that the controller(s) 123 is to deallocate the logical addresses 210 associated with a given stream, the deallocation process may be simplified, rendered more efficient, and streamlined, since the controller(s) 123 may deallocate or un-map the data 119, 202 associated with that stream in a single operation or time instance.

Moreover, by utilizing a dedicated deallocation bit or otherwise indicating to the controller(s) 123 whether or not the controller(s) 123 may deallocate logical blocks 702 associated with the stream via indicator 1118, as opposed to, for example, omitting this indicator 1118 in the request 1116 and simply triggering the controller(s) 123 to always deallocate the data in response to the stream release command per se, the host device 104 may be provided more flexibility in managing its stream identifiers 1106, 1114. This flexibility is useful since in some cases the host 104 may not intend to release or de-allocate all the data associated with a given stream when the host releases a stream identifier, as there may still be some valid data that the host 104 intends to maintain. As an example, if the host 104 is running low or out of available stream identifiers to apply for a stream of data 119, 202, then instead of setting deallocation bit 1119 at block 1002 to for example release the stream identifier and deallocate the logical blocks because the data 119, 202 is obsolete or expired, here the host 104 may reset the deallocation bit 1119 to indicate the controller(s) 123 to release a particular stream identifier yet maintain the logical blocks 702 to be reused for a different purpose since the data 119, 202 is still valid. Thus, in such scenarios, the separate deallocation indicator 1118 in the command context may provide the host 104 with flexibility to indicate whether to deallocate or delete all the data associated with a given stream via a stream release identifier operation (e.g., by setting the deallocation bit 1119 in the command), or merely to detach the data or logical blocks from the stream while retaining mappings to the valid data in mapping tables 120, 205, 1110 for later use (e.g., by resetting the deallocation bit 1119 in the command).

Furthermore, when the controller(s) 123 manage groups of logical blocks 702 in respective superblocks 802 such as illustrated in FIG. 8, then configuring the controller(s) 123 at block 1004 to release entire superblock(s) 802 associated with a given stream (e.g., in response to identifying the range of data or logical addresses 210 associated with that stream) may result in faster and uninterrupted deallocation compared to the process of FIG. 9. For instance, latency and performance may be improved since the controller(s) 123 may de-map entire superblock(s) 802 associated with the released stream at once, rather than processing individual DSM commands 1122 after waiting for all DSM commands to arrive from the host. This approach may also allow the controller(s) 123 at block 1124 to avoid performing partial block deallocations and extensive L2P updates such as described with respect to FIG. 9, resulting in the deallocation process being more efficient and less resource-intensive. For instance, rather than scanning superblock 802, keeping track of how much valid data is present in that superblock 802 (e.g., which logical blocks 702 remain valid), and updating L2P mapping entries 206 associated with that superblock 802 in response to a partial deallocation of that superblock, here the controller(s) 123 may more simply update the mapping table(s) 120, 205, 1110 to reflect the de-mapped logical addresses 210 in response to a complete deallocation of the superblock 802, without the aforementioned scanning or data validity tracking due to delayed DSM commands 1122 incoming.

In one example, instead of more complexly scanning the NVM 110, 201 to identify a portion of valid logical addresses associated with a superblock 802 to be de-mapped from a released stream in response to various DSM commands 1122, here the controller(s) 123 may more simply determine from a separate, superblock mapping table 1110 the entirety of the logical address range associated with that superblock 802 to be de-mapped from the released stream, avoiding the need for operationally intensive processes. For instance, initially prior to block 1002 and in response to stream open commands or write commands, such as at block 1108, the controller(s) 123 may populate superblock mapping table 1110 with logical address mappings 1112 to one or more superblocks 802 associated with stream identifiers 1114. Then later on at block 1004, the controller(s) 123 may ascertain the ranges of logical addresses 210 associated with the released stream identifier 1106 from the superblock mapping table 1110, and the controller(s) 123 may de-map the superblock 802 from the stream identifier 1106 in the superblock mapping table 1110 and the logical addresses 210 from the physical addresses 208 in the L2P mapping table 120, 205. In this way, by allowing the controller(s) 123 to directly deallocate or release entire superblocks 802 associated with a given stream and thus eliminating the need for partial block deallocations and extensive updates to L2P mapping, this approach reduces the chances of the controller(s) 123 performing garbage collection to free blocks of invalid data in contrast to the process of FIG. 9, thereby improving WAF and simplifying the overall stream release process.

As a result, the streamlined process of FIGS. 10 and 11 simplifies host and storage device communication and improves overall efficiency for stream releases, without requiring the host 104 to manage the logical-to-physical mapping information. This approach avoids the need for piecemeal processing of DSM commands and reduces the number of extensive controller operations. It eliminates the need for extensive searching and identification of data for deallocation or other operationally intensive processes. Moreover, while the approach of FIG. 9 handled deallocation requests by the host in a delayed or interleaved manner to avoid blocking host read or write traffic, the process of FIGS. 10 and 11 allow the controller(s) 123 to ascertain the logical space to be deallocated directly from the stream release request 1116, and thereby handle the invalidation or deallocation without intervention from the host 104.

Figure 12:
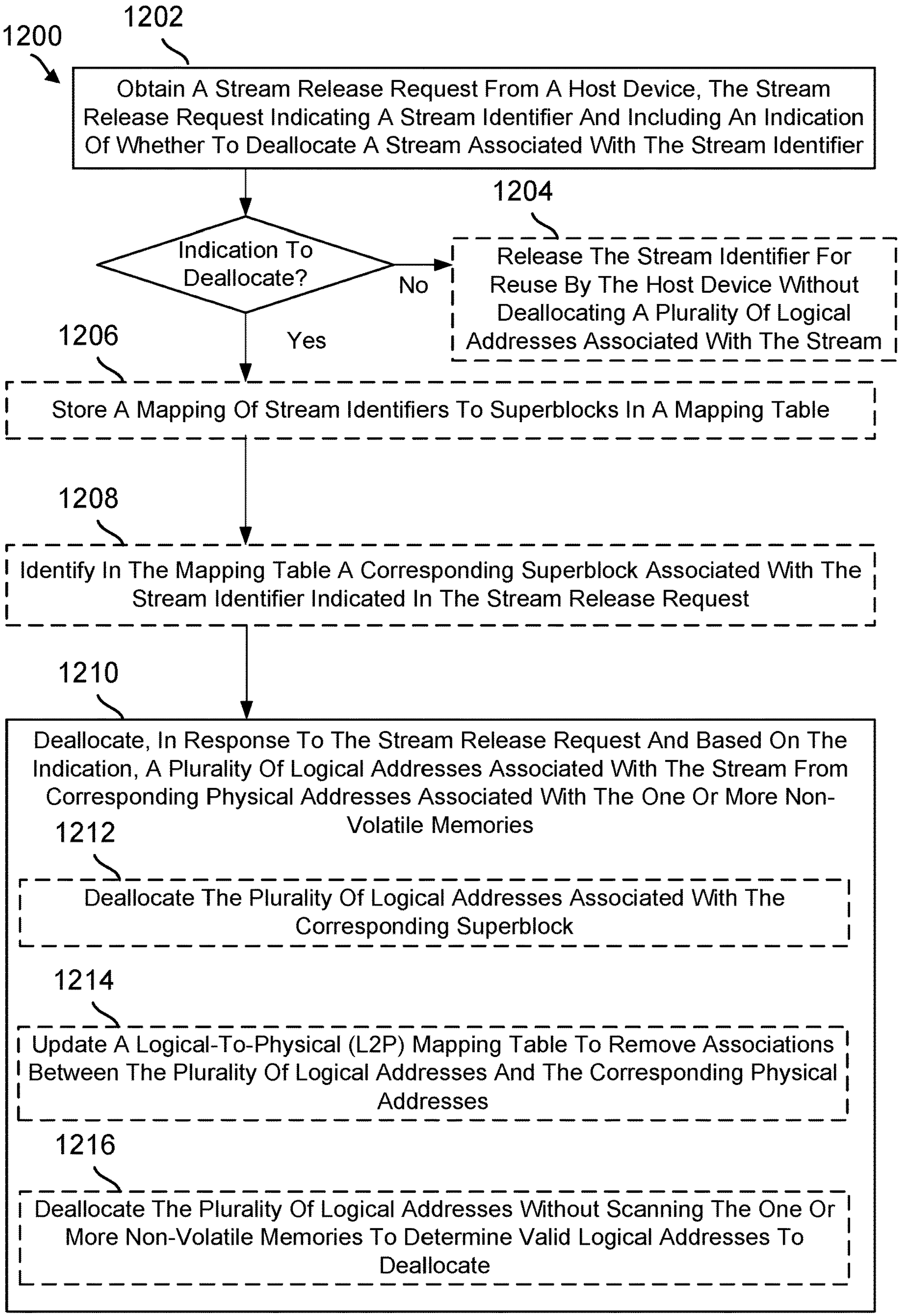
FIG. 12 is a flow chart illustrating an example of a method for releasing a stream in the storage device of FIG. 1.

FIG. 12 illustrates an example flow chart 1200 of a method for releasing a stream in a storage device. For example, the method can be carried out in a storage device 102 such as the one illustrated in FIG. 1. Each of the steps in the flow chart can be controlled using one or more controllers, individually or in combination, as described below (e.g., controller(s) 123), by a component or module of one or more of the controller(s), or by some other suitable means. For example, the controller(s) 123 of storage device 102, individually or in combination, may include software, firmware, hardware, and/or a combination of software, firmware, and/or hardware, which is configured to release a stream in the storage device 102 in accordance with some or all of the operations in flow chart 1200.

At block 1202, the controller(s), individually or in combination, obtain a stream release request from a host device, the stream release request indicating a stream identifier and including an indication of whether to deallocate a stream associated with the stream identifier. The controller(s), individually or in combination, may obtain the stream release request without a subsequent DSM request from the host device. For instance, referring to FIGS. 10 and 11, controller(s) 123 may receive stream release request 1116 from host 104 at block 1002 including deallocation indicator 1118 associated with stream identifier 1106, without receiving any DSM commands 1122 from host 104 to deallocate the stream.

In some aspects, at block 1204, the controller(s) may, individually or in combination, release the stream identifier for reuse by the host device without deallocating a plurality of logical addresses associated with the stream based on the indication. For example, the indication of whether to deallocate the stream may be a deallocation bit in the stream release request, and the controller(s), individually or in combination, may release the stream identifier but refrain from deallocating the logical addresses in response to the deallocation bit being reset. For instance, referring to FIGS. 10 and 11, controller(s) 123 may release stream identifier 1106 for reuse by host 104 for a different stream, but refrain from deallocating the logical addresses for that stream at block 1004, in response to deallocation indicator 1118 being deallocation bit 1119 that is reset.

In some aspects, at block 1206, the controller(s) may, individually or in combination, store a mapping of stream identifiers to superblocks in a mapping table. For instance, referring to FIG. 11, controller(s) 123 may store mapping 1112 of stream identifiers 1114 to superblocks 802 in superblock mapping table 1110.

In some aspects, at block 1208, the controller(s) may, individually or in combination, identify in the mapping table a corresponding superblock associated with the stream identifier indicated in the stream release request. For instance, referring to FIG. 11, controller(s) 123 may identify in superblock mapping table 1110 the superblock 802 mapped to stream identifier 1106.

At block 1210, the controller(s), individually or in combination, deallocate, in response to the stream release request and based on the indication, a plurality of logical addresses associated with the stream from corresponding physical addresses associated with the one or more non-volatile memories. For example, the indication of whether to deallocate the stream may be a deallocation bit in the stream release request, and the controller(s), individually or in combination, may deallocate the plurality of logical addresses in response to the deallocation bit being set. The controller(s), individually or in combination, may deallocate the plurality of logical addresses in response to the obtained stream release request at block 1202 without the subsequent DSM request. For instance, referring to FIGS. 10 and 11, controller(s) may at block 1004 deallocate the logical addresses 210 corresponding to stream identifier 1106 from the physical addresses 208 of blocks 402 in NVM(s) 110, 201, without receiving any DSM commands 1122 from host 104 to deallocate the stream, and in response to stream release request 1116 including deallocation indicator 1118 that indicates to perform this deallocation. For example, controller(s) may deallocate the logical address ranges at block 1004 in response to deallocation indicator 1118 being deallocation bit 1119 that is set.

In some aspects, the plurality of logical addresses may correspond to an entirety of a superblock. For instance, referring to FIG. 11, the logical addresses 210 that controller(s) 123 deallocate at block 1004 may correspond to logical blocks 702 constituting the entirety of superblock 802.

In some aspects, at block 1212, the controller(s) may, individually or in combination, deallocate the plurality of logical addresses associated with the corresponding superblock identified at block 1208. For instance, referring to FIGS. 10 and 11, controller(s) 123 may at block 1004 deallocate the logical addresses 210 which correspond to the logical blocks 702 of the superblock 802 associated with stream identifier 1106.

In some aspects, at block 1214, the controller(s) may, individually or in combination, update a L2P mapping table to remove associations between the plurality of logical addresses and the corresponding physical addresses. For instance, referring to FIGS. 10 and 11, controller(s) may at block 1004 de-map the logical addresses 210 corresponding to stream identifier 1106 from the physical addresses 208 indicated in L2P mapping table 120, 205 which correspond to blocks 402 in NVM(s) 110, 201.

In some aspects, at block 1216, the controller(s) may, individually or in combination, deallocate the plurality of logical addresses without scanning the one or more non-volatile memories to determine valid logical addresses to deallocate. For instance, referring to FIGS. 10 and 11, the controller(s) 123 may at block 1004 deallocate the logical addresses 210 corresponding to stream identifier 1106 without performing scanning or data validity tracking of superblock 802 or L2P mapping table 120, 205 in NVM(s) 110, 201 at block 1124.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

Figure 13:
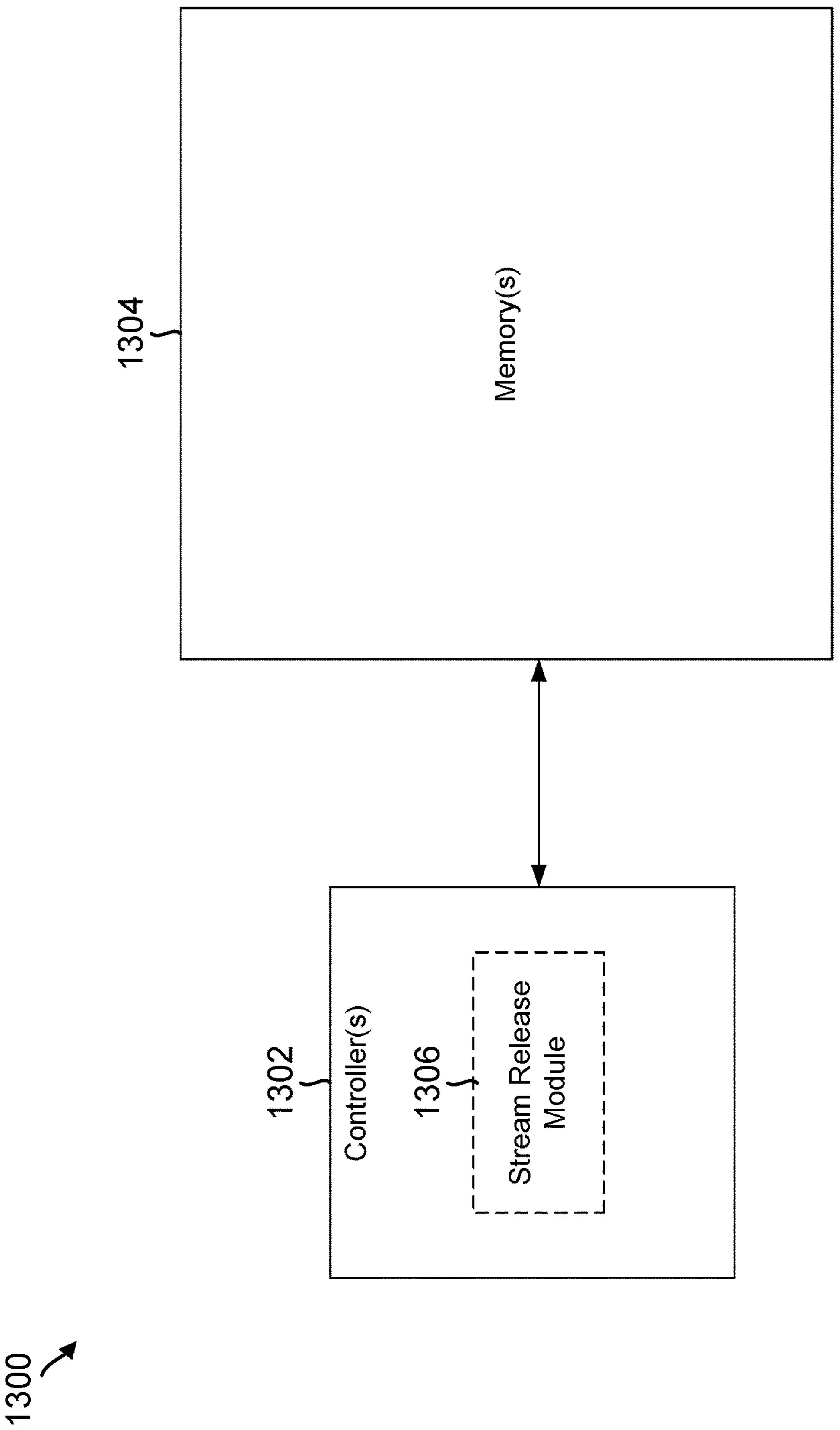
FIG. 13 is a conceptual diagram illustrating an example of one or more controllers that individually or in combination release a stream in the storage device of FIG. 1.

FIG. 13 illustrates an example 1300 of one or more controllers 1302 each communicatively coupled to at least one of one or more memories 1304 in storage device 102. For example, controller(s) 1302 may correspond to controller(s) 123 and the one or more memories 1304 may correspond to a computer-readable medium in storage device 102 of FIG. 1, such as the NVM(s) 110, 201 or one or more of the volatile memories 117, 118. The computer-readable medium/one or more memories 1304 may be non-transitory. The one or more controllers 1302 may execute software stored on the computer-readable medium/one or more memories 1304 individually or in combination. The software, when executed by the one or more controllers 1302, causes the one or more controllers to, individually or in combination, perform the various functions described supra. The controller(s) may be implemented in software, hardware, or a combination of hardware and software. In one exemplary embodiment, the controller(s) are each implemented with several software modules executed on one or more processors to perform the various controller functions previously described, but as those skilled in the art will appreciate, the controller(s) may be implemented in different ways. The skilled artisan will readily understand how best to implement the controller(s) based on the particular design parameters of the system.

In one example, the controller(s) 1302 individually or in combination include a stream release module 1306 that may provide a means for releasing a stream in the storage device. For example, the stream release module 1306 may perform operations of the process described above with respect to FIG. 12, including at least obtaining a stream release request from a host device, the stream release request indicating a stream identifier and including an indication of whether to deallocate the stream associated with the stream identifier, and deallocating, in response to the stream release request and based on the indication, a plurality of logical addresses associated with the stream from corresponding physical addresses associated with the one or more non-volatile memories. As previously described, the controller(s) may each be implemented with software modules executed on one or more processors, or may otherwise be implemented in firmware, hardware, and/or a combination of software, firmware and/or hardware. Thus, the aforementioned means may be the one or more processor(s), a software module, firmware, hardware, and/or a combination of software, firmware and/or hardware, configured in the controller(s) to individually or in combination perform one or more operations of the process described above with respect to FIG. 12.

Accordingly, the present disclosure provides for improved efficiency of the stream release process in NVMe storage systems by offloading the stream content deallocation to the controller, reducing host overhead, and preventing performance and latency issues associated with the traditional approach of using DSM commands. For instance, in response to the host sending a bit in the command context, the controller(s) may manage optimized deallocation for improved host and storage device performance. The present disclosure also provides for improved efficiency of deallocating data associated with a released stream identifier in an NVMe storage system by streamlining the process. For instance, the controller(s) may determine the superblocks or namespaces associated with the stream release identifier upfront, and then deallocate the blocks in a single operation, rather than processing multiple DSM commands. The controller(s) may release entire superblocks associated with a given stream, eliminating the need for partial block deallocations and extensive L2P updates, resulting in a more efficient and less resource-intensive process. The present disclosure provides for simplified host and device communication in the case of stream release by allowing the controller(s) to directly deallocate entire superblocks associated with a given stream. This approach reduces the need for interleaved host I/O operations and garbage collection, resulting in improved write amplification factors and a more efficient process overall.

Additionally, the present disclosure provides flexibility for the host in managing its stream identifiers and deciding whether to delete all the data associated with a given stream or just detach the data set from the stream while retaining some valid data. The present disclosure provides for reduced latency and write amplification when the host intends to deallocate the physical blocks associated with a stream, while conservatively avoiding impact to stream release identifier operations when the host only intends to reuse the identifier for a different purpose. The present disclosure also provides for a simplified process of deallocating data associated with a released stream ID in an NVMe storage system by offloading the deallocation responsibility from the host to the controller(s). This approach reduces host overhead, latency, and the need for extensive scanning and updating of mapping tables, providing a more efficient and streamlined process compared to prior stream deallocation approaches. The present disclosure provides for extending of the stream release command with a deallocation bit that allows the controller(s) to directly deallocate entire superblocks associated with a given stream. This approach simplifies the process of deallocating data, reduces host overhead, and improves overall efficiency in an NVMe storage system.

Implementation examples are described in the following numbered clauses:

Clause 1. A storage device, comprising: one or more non-volatile memories; and one or more controllers each communicatively coupled with at least one of the one or more non-volatile memories, the one or more controllers, individually or in any combination, operable to: obtain a stream release request from a host device, the stream release request indicating a stream identifier and including an indication of whether to deallocate a stream associated with the stream identifier; and deallocate, in response to the stream release request and based on the indication, a plurality of logical addresses associated with the stream from corresponding physical addresses associated with the one or more non-volatile memories.

Clause 2. The storage device of clause 1, wherein the plurality of logical addresses corresponds to an entirety of a superblock.

Clause 3. The storage device of clause 1 or clause 2, wherein the indication of whether to deallocate the stream is a deallocation bit in the stream release request.

Clause 4. The storage device of clause 3, wherein the one or more controllers, individually or in combination, are further operable to: deallocate the plurality of logical addresses in response to the deallocation bit being set.

Clause 5. The storage device of clause 3, wherein the one or more controllers, individually or in combination, are further operable to: release the stream identifier for reuse by the host device without deallocating the plurality of logical addresses in response to the deallocation bit being reset.

Clause 6. The storage device of any of clauses 1 to 5, wherein the one or more controllers, individually or in combination, are further operable to: store a mapping of stream identifiers to superblocks in a mapping table; identify in the mapping table a corresponding superblock associated with the stream identifier indicated in the stream release request; and deallocate the plurality of logical addresses associated with the corresponding superblock.

Clause 7. The storage device of any of clauses 1 to 6, wherein to deallocate the plurality of logical addresses, the one or more controllers, individually or in combination, are operable to: update a logical-to-physical (L2P) mapping table to remove associations between the plurality of logical addresses and the corresponding physical addresses.

Clause 8. The storage device of any of clauses 1 to 7, wherein the one or more controllers, individually or in combination, are further operable to: obtain the stream release request without a subsequent Data Set Management (DSM) request from the host device; and deallocate the plurality of logical addresses in response to the obtained stream release request without the subsequent DSM request.

Clause 9. The storage device of any of clauses 1 to 8, wherein the one or more controllers, individually or in combination, are further operable to: deallocate the plurality of logical addresses without scanning the one or more non-volatile memories to determine valid logical addresses to deallocate.

Clause 10. A method for releasing a stream in a storage device, the method comprising: obtaining a stream release request from a host device, the stream release request indicating a stream identifier and including an indication of whether to deallocate the stream associated with the stream identifier; and deallocating, in response to the stream release request and based on the indication, a plurality of logical addresses associated with the stream from corresponding physical addresses associated with one or more non-volatile memories.

Clause 11. The method of clause 10, wherein the plurality of logical addresses corresponds to an entirety of a superblock.

Clause 12. The method of clause 10 or clause 11, wherein the indication of whether to deallocate the stream is a deallocation bit in the stream release request.

Clause 13. The method of clause 12, wherein the plurality of logical addresses is deallocated in response to the deallocation bit being set.

Clause 14. The method of any of clauses 10 to 13, further comprising: storing a mapping of stream identifiers to superblocks in a mapping table; and identifying in the mapping table a corresponding superblock associated with the stream identifier indicated in the stream release request; wherein the deallocated, plurality of logical addresses is associated with the corresponding superblock.

Clause 15. The method of any of clauses 10 to 14, wherein the deallocating comprises: updating a logical-to-physical (L2P) mapping table to remove associations between the plurality of logical addresses and the corresponding physical addresses.

Clause 16. The method of any of clauses 10 to 15, wherein the stream release request is obtained without a subsequent Data Set Management (DSM) request from the host device, and the plurality of logical addresses is deallocated in response to the obtained stream release request without the subsequent DSM request.

Clause 17. The method of any of clauses 10 to 16, wherein the plurality of logical addresses is deallocated without scanning the one or more non-volatile memories to determine valid logical addresses to deallocate.

Clause 18. A storage device, comprising: one or more non-volatile memories; and means for releasing a stream in the storage device, the means for releasing being configured to: obtain a stream release request from a host device, the stream release request indicating a stream identifier and including an indication of whether to deallocate the stream associated with the stream identifier; and deallocate, in response to the stream release request and based on the indication, a plurality of logical addresses associated with the stream from corresponding physical addresses associated with the one or more non-volatile memories.

Clause 19. The storage device of clause 18, wherein the plurality of logical addresses corresponds to an entirety of a superblock.

Clause 20. The storage device of clause 18 or clause 19, wherein the indication of whether to deallocate the stream is a deallocation bit in the stream release request.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the disclosure include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

As used herein, a controller, at least one controller, and/or one or more controllers, individually or in combination, configured to perform or operable for performing a plurality of actions (such as the functions described supra) is meant to include at least two different controllers able to perform different, overlapping or non-overlapping subsets of the plurality of actions, or a single controller able to perform all of the plurality of actions. In one non-limiting example of multiple controllers being able to perform different ones of the plurality of actions in combination, a description of a controller, at least one controller, and/or one or more controllers configured or operable to perform actions X, Y, and Z may include at least a first controller configured or operable to perform a first subset of X, Y, and Z (e.g., to perform X) and at least a second controller configured or operable to perform a second subset of X, Y, and Z (e.g., to perform Y and Z). Alternatively, a first controller, a second controller, and a third controller may be respectively configured or operable to perform a respective one of actions X, Y, and Z. It should be understood that any combination of one or more controller each may be configured or operable to perform any one or any combination of a plurality of actions.

Similarly as used herein, a memory, at least one memory, a computer-readable medium, and/or one or more memories, individually or in combination, configured to store or having stored thereon instructions executable by one or more controllers or processors for performing a plurality of actions (such as the functions described supra) is meant to include at least two different memories able to store different, overlapping or non-overlapping subsets of the instructions for performing different, overlapping or non-overlapping subsets of the plurality of actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, a computer-readable medium, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, a second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more controllers or processors to perform any one or any combination of a plurality of actions. Moreover, one or more controllers or processors may each be coupled to at least one of the one or more memories and configured or operable to execute the instructions to perform the plurality of actions. For instance, in the above non-limiting example of the different subset of instructions for performing actions X, Y, and Z, a first controller may be coupled to a first memory storing instructions for performing action X, and at least a second controller may be coupled to at least a second memory storing instructions for performing actions Y and Z, and the first controller and the second controller may, in combination, execute the respective subset of instructions to accomplish performing actions X, Y, and Z. Alternatively, three controllers may access one of three different memories each storing one of instructions for performing X, Y, or Z, and the three controllers may in combination execute the respective subset of instruction to accomplish performing actions X, Y, and Z. Alternatively, a single controller may execute the instructions stored on a single memory, or distributed across multiple memories, to accomplish performing actions X, Y, and Z.

The various aspects of this disclosure are provided to enable one of ordinary skill in the art to practice the exemplary embodiments of the present disclosure. Various modifications to exemplary embodiments presented throughout this disclosure will be readily apparent to those skilled in the art, and the concepts disclosed herein may be extended to other storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:

one or more non-volatile memories; and one or more controllers each communicatively coupled with at least one of the one or more non-volatile memories, the one or more controllers, individually or in any combination, operable to:

obtain a stream release request from a host device without a subsequent Data Set Management (DSM) request from the host device, the stream release request indicating a stream identifier and including an indication of whether to deallocate a stream associated with the stream identifier, wherein the indication of whether to deallocate the stream is a deallocation bit in the stream release request, wherein the deallocation bit indicates whether or not to deallocate logical blocks associated with the stream; and deallocate, in response to the stream release request and based on the indication, a plurality of logical addresses associated with the stream from corresponding physical addresses associated with the one or more non-volatile memories in response to the obtained stream release request without the subsequent DSM request.

2. The storage device of claim 1, wherein the plurality of logical addresses corresponds to an entirety of a superblock.

3. The storage device of claim 1, wherein the one or more controllers, individually or in combination, are further operable to:

deallocate the plurality of logical addresses in response to the deallocation bit being set.

4. The storage device of claim 1, wherein the one or more controllers, individually or in combination, are further operable to:

release the stream identifier for reuse by the host device without deallocating the plurality of logical addresses in response to the deallocation bit being reset.

5. The storage device of claim 1, wherein the one or more controllers, individually or in combination, are further operable to:

store a mapping of stream identifiers to superblocks in a mapping table;

identify in the mapping table a corresponding superblock associated with the stream identifier indicated in the stream release request; and deallocate the plurality of logical addresses associated with the corresponding superblock.

6. The storage device of claim 1, wherein to deallocate the plurality of logical addresses, the one or more controllers, individually or in combination, are operable to:

update a logical-to-physical (L2P) mapping table to remove associations between the plurality of logical addresses and the corresponding physical addresses.

7. The storage device of claim 1, wherein the one or more controllers, individually or in combination, are further operable to:

deallocate the plurality of logical addresses without scanning the one or more non-volatile memories to determine valid logical addresses to deallocate.

8. A method for releasing a stream in a storage device, the method comprising:

obtaining a stream release request from a host device, the stream release request indicating a stream identifier and including an indication of whether to deallocate the stream associated with the stream identifier, wherein the indication of whether to deallocate the stream is a deallocation bit in the stream release request, wherein the deallocation bit indicates whether or not to deallocate logical blocks associated with the stream; and deallocating, in response to the stream release request and based on the indication, a plurality of logical addresses associated with the stream from corresponding physical addresses associated with one or more non-volatile memories, wherein the stream release request is obtained without a subsequent Data Set Management (DSM) request from the host device, and the plurality of logical addresses is deallocated in response to the obtained stream release request without the subsequent DSM request.

9. The method of claim 8, wherein the plurality of logical addresses corresponds to an entirety of a superblock.

10. The method of claim 8, wherein the plurality of logical addresses is deallocated in response to the deallocation bit being set.

11. The method of claim 8, further comprising:

storing a mapping of stream identifiers to superblocks in a mapping table; and identifying in the mapping table a corresponding superblock associated with the stream identifier indicated in the stream release request;

wherein the deallocated, plurality of logical addresses is associated with the corresponding superblock.

12. The method of claim 8, wherein the deallocating comprises:

updating a logical-to-physical (L2P) mapping table to remove associations between the plurality of logical addresses and the corresponding physical addresses.

13. The method of claim 8, wherein the plurality of logical addresses is deallocated without scanning the one or more non-volatile memories to determine valid logical addresses to deallocate.

14. A storage device, comprising:

one or more non-volatile memories; and means for releasing a stream in the storage device, the means for releasing being configured to:

obtain a stream release request from a host device, the stream release request indicating a stream identifier and including an indication of whether to deallocate the stream associated with the stream identifier, wherein the indication of whether to deallocate the stream is a deallocation bit in the stream release request, wherein the deallocation bit indicates whether or not to deallocate logical blocks associated with the stream; and deallocate, in response to the stream release request and based on the indication, a plurality of logical addresses associated with the stream from corresponding physical addresses associated with the one or more non-volatile memories, wherein the stream release request is obtained without a subsequent Data Set Management (DSM) request from the host device, and the plurality of logical addresses is deallocated in response to the obtained stream release request without the subsequent DSM request.

15. The storage device of claim 14, wherein the plurality of logical addresses corresponds to an entirety of a superblock.

* * * * *